(12) United States Patent
Horikoshi et al.

(10) Patent No.: US 11,256,140 B2
(45) Date of Patent: Feb. 22, 2022

(54) LIQUID CRYSTAL DISPLAY APPARATUS AND DISPLAY METHOD

(71) Applicant: SONY CORPORATION, Tokyo (JP)

(72) Inventors: Ryoko Horikoshi, Kanagawa (JP); Keigo Inoue, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/976,903

(22) PCT Filed: Feb. 12, 2019

(86) PCT No.: PCT/JP2019/004874
§ 371 (c)(1),
(2) Date: Aug. 31, 2020

(87) PCT Pub. No.: WO2019/193838
PCT Pub. Date: Oct. 10, 2019

(65) Prior Publication Data
US 2021/0041734 A1    Feb. 11, 2021

(30) Foreign Application Priority Data
Apr. 2, 2018  (JP) .............. JP2018-070908

(51) Int. Cl.
*G02F 1/13363* (2006.01)
*G02F 1/1335* (2006.01)
(52) U.S. Cl.
CPC .... *G02F 1/13363* (2013.01); *G02F 1/133528* (2013.01); *G02F 2203/02* (2013.01)
(58) Field of Classification Search
None
See application file for complete search history.

(56) References Cited

U.S. PATENT DOCUMENTS

2006/0050215 A1* 3/2006 Haruyama .......... G02F 1/13363
                                                     349/117
2006/0132687 A1    6/2006 Chang et al.
(Continued)

FOREIGN PATENT DOCUMENTS

JP    2009-25541 A    2/2009
JP    2009-37025 A    2/2009
(Continued)

OTHER PUBLICATIONS

International Search Report dated Apr. 2, 2019 in PCT/JP2019/004874 filed on Feb. 12, 2019, 2 pages.

*Primary Examiner* — Ryan Crockett
(74) *Attorney, Agent, or Firm* — Oblon, McClelland, Maier & Neustadt, L.L.P.

(57) ABSTRACT

An optical system is downsized by reducing a tilt angle of an optical compensating plate including a medium having a small refractive index in the thickness direction, in achieving a predetermined contrast.
A liquid crystal display apparatus according to the present technology includes a vertical alignment liquid crystal panel, a first optical compensation unit including a medium having a small refractive index in a thickness direction, and being arranged with being tilted from a state parallel to the liquid crystal panel, at a position at which light having passed through the liquid crystal panel or not having passed through the liquid crystal panel enters, and a second optical compensation unit having refractive index aeolotropy at least in an in-plane direction, and being arranged at a position at which light having passed through the liquid crystal panel or not having passed through the liquid crystal panel enters.

10 Claims, 18 Drawing Sheets

(56) References Cited

U.S. PATENT DOCUMENTS

| | | | |
|---|---|---|---|
| 2008/0043158 A1* | 2/2008 | Shirasaka | G03B 21/28 349/9 |
| 2010/0149638 A1* | 6/2010 | Kashima | G02B 5/3083 359/489.2 |
| 2014/0092320 A1* | 4/2014 | Yamaguchi | G02F 1/133528 349/5 |
| 2016/0054500 A1* | 2/2016 | Koike | G02B 1/11 353/20 |

FOREIGN PATENT DOCUMENTS

| | | |
|---|---|---|
| JP | 2009-229971 A | 10/2009 |
| JP | 2014-219672 A | 11/2014 |

\* cited by examiner

FIG. 6
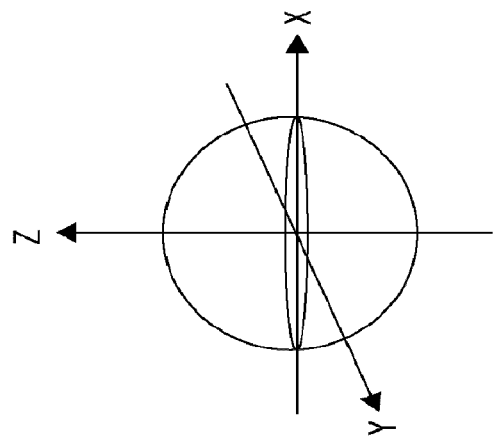
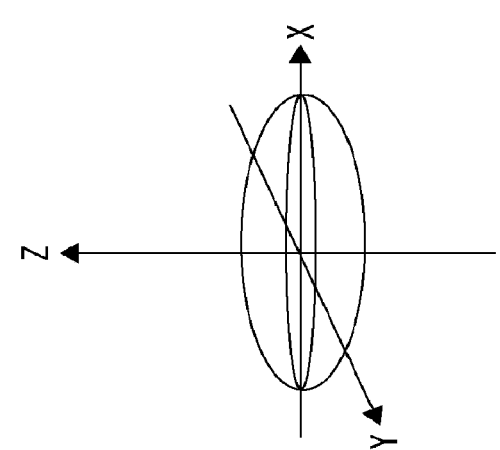
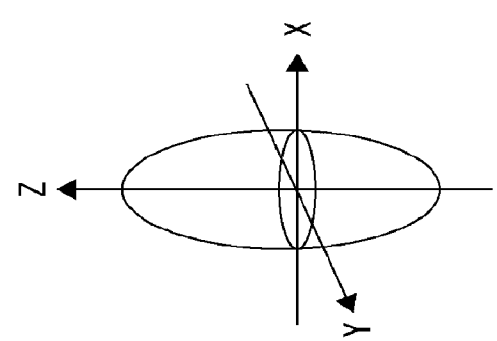

FIG. 8
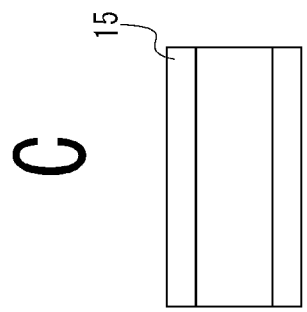
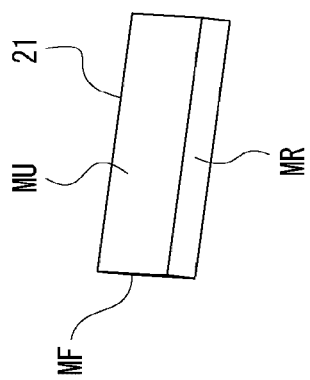
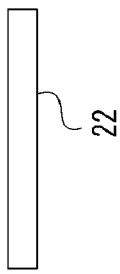
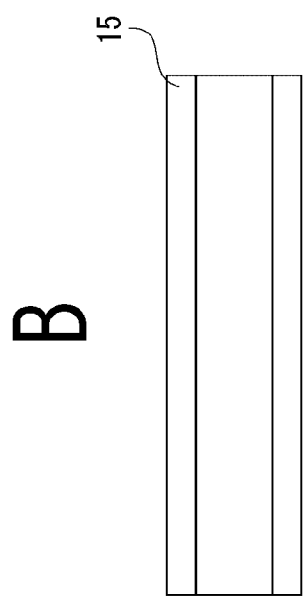
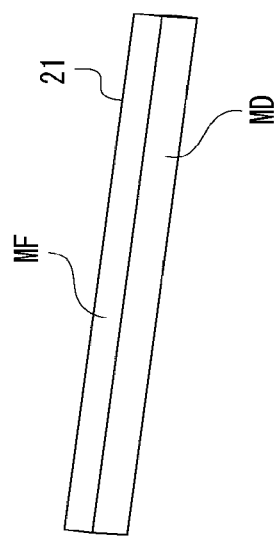
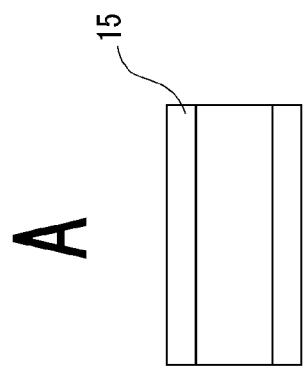
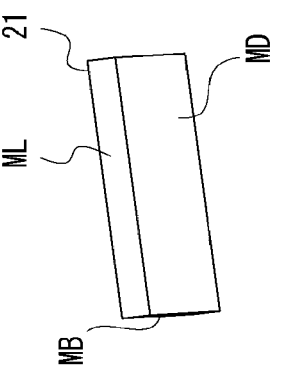

FIG. 9
A
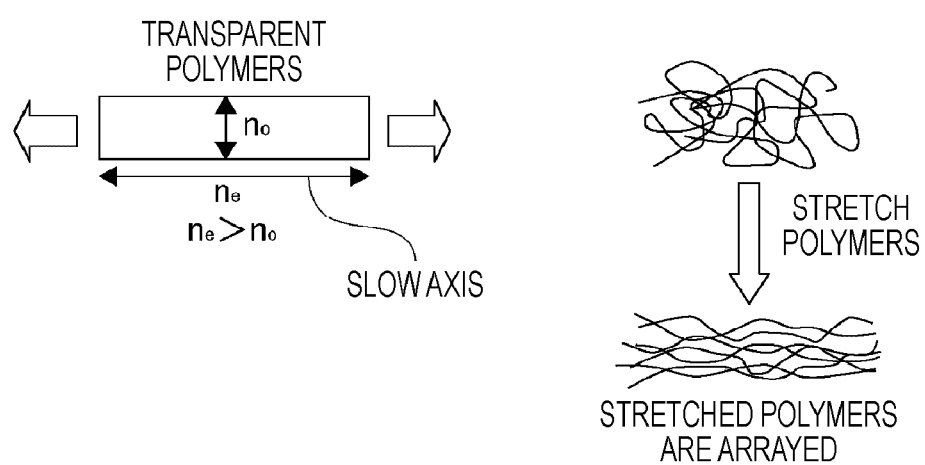
B
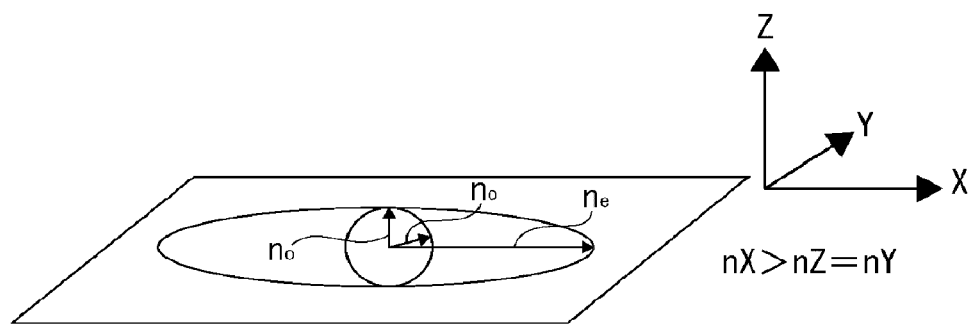

FIG. 10
A
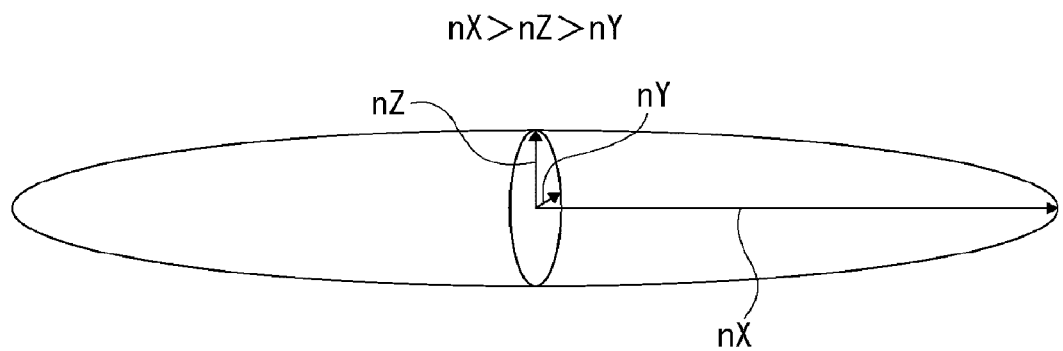
B
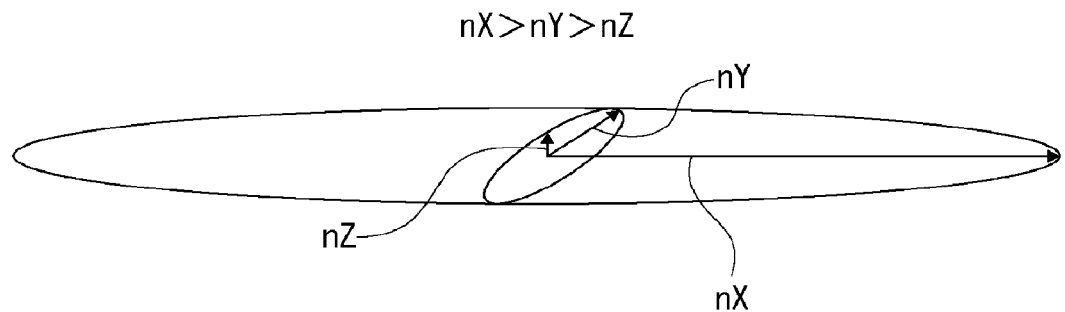

FIG. 11
A
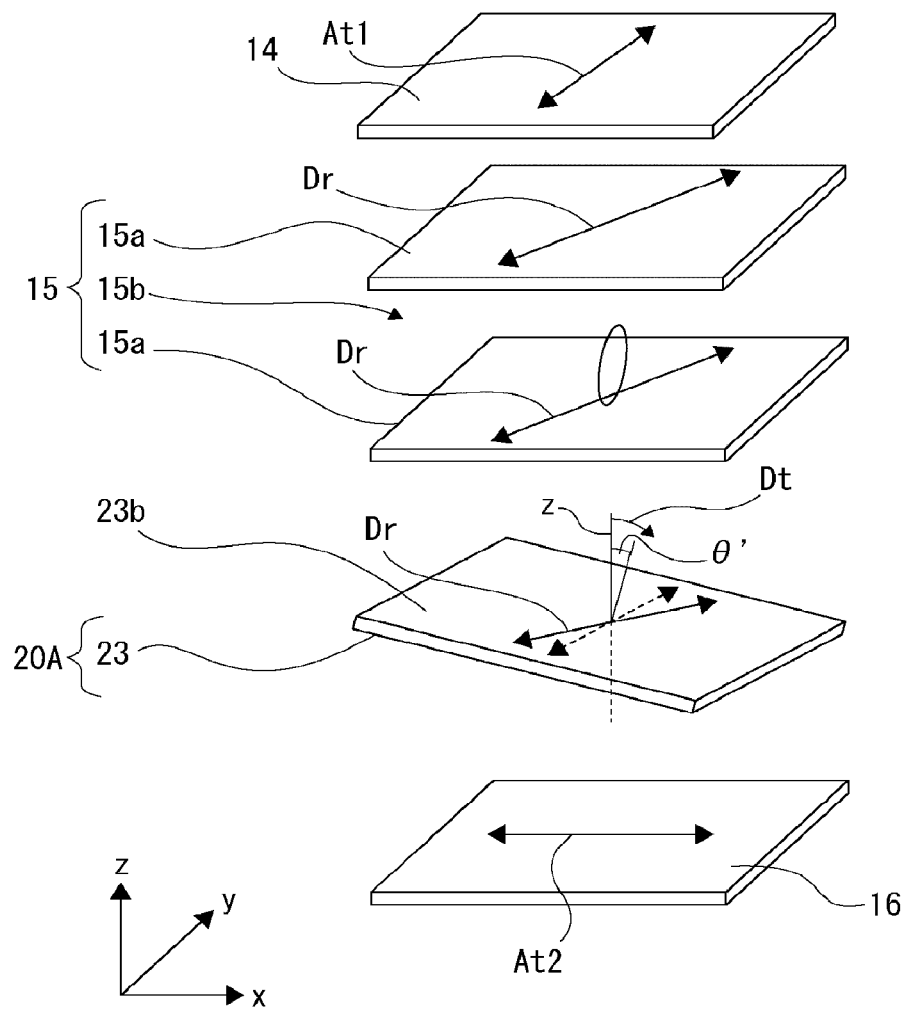
B
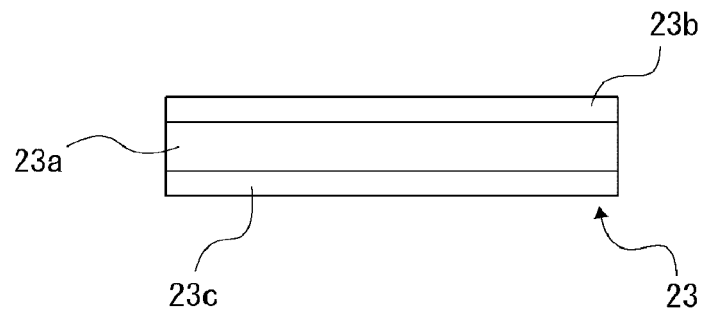

FIG. 12
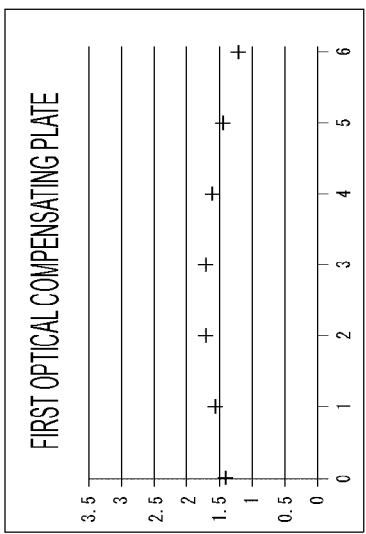
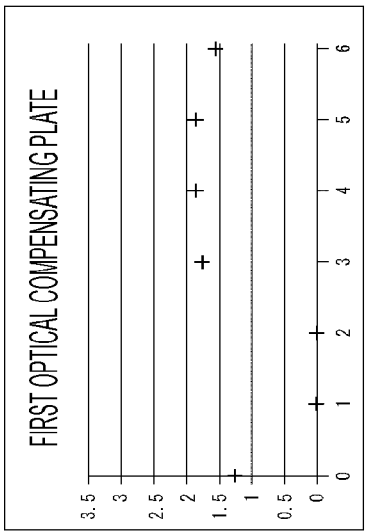
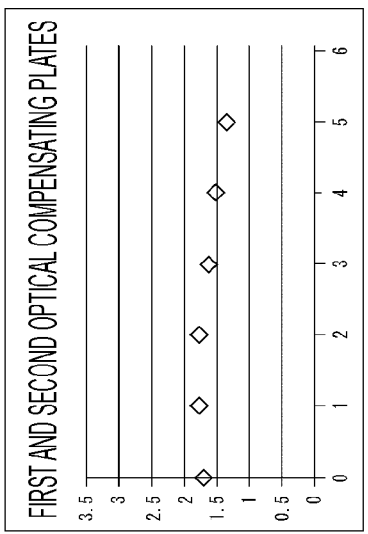
A [Low Panel]
B [Typical Panel]
C [High Panel]
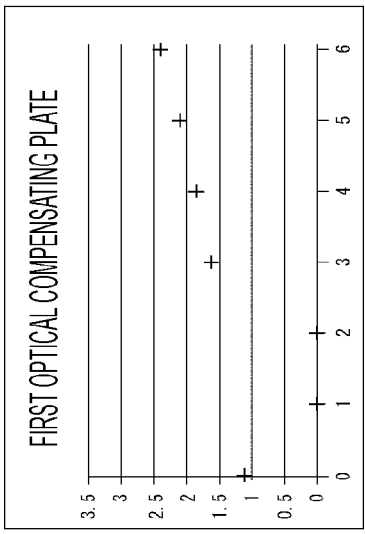
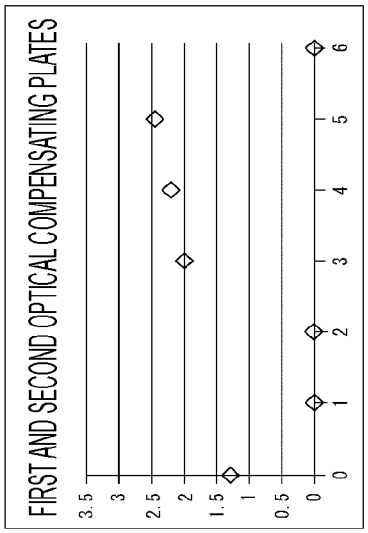
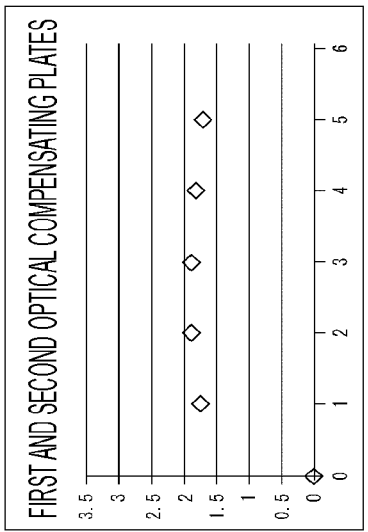

FIG. 13
A
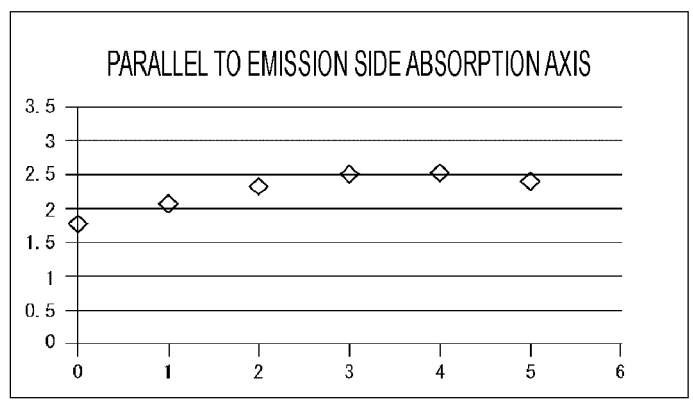
B
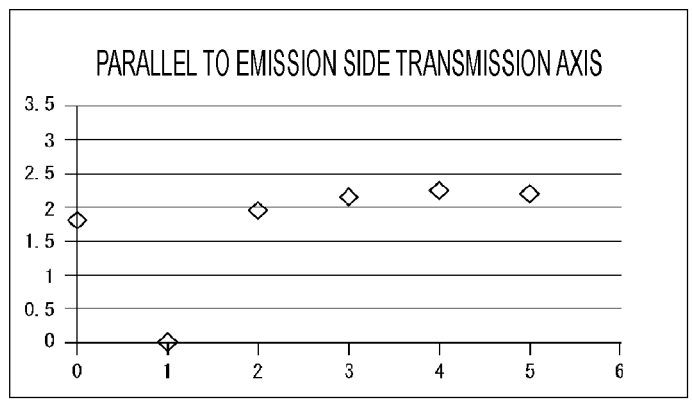
FIG. 14
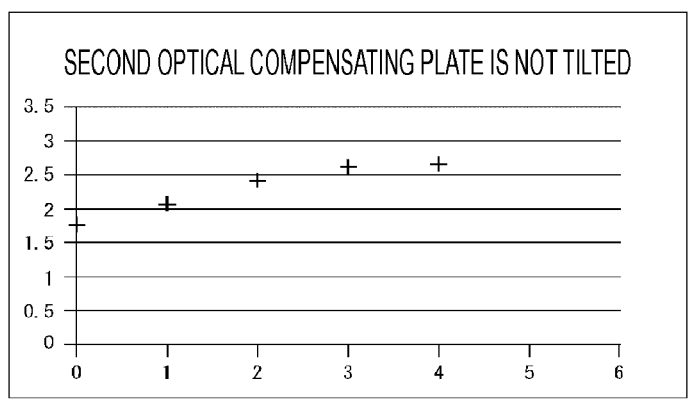

LIQUID CRYSTAL DISPLAY APPARATUS AND DISPLAY METHOD

TECHNICAL FIELD

The present technology relates to a liquid crystal display apparatus including a vertical alignment liquid crystal panel, and a display method that uses the liquid crystal panel, and relates particularly to a technical field for compensating for a phase shift generated in light having passed through a liquid crystal panel.

BACKGROUND ART

For example, a liquid crystal projector apparatus has been known as a liquid crystal display apparatus that displays image information using a liquid crystal panel. The liquid crystal projector apparatus generates image light reflecting image information, by causing light generated by a light source to enter the liquid crystal panel and performing spatial light modulation, and displays the image information by projecting the generated image light onto a target medium such as screen, for example.

As one of important factors affecting the quality of an image to be projected in this manner, there is contrast indicating a ratio of brightness between black display and white display. For improving contrast in the liquid crystal projector apparatus, it is effective to set the brightness in black display to a minimal value.

On the other hand, in recent years, some liquid crystal projector apparatuses use a vertical alignment (VA) panel as a liquid crystal panel. In the VA liquid crystal panel, liquid crystal alignment is set to be vertical to a substrate of a panel when voltage is not applied, and a liquid crystal is tilted with respect to the vertical direction of the substrate when voltage is applied. The VA liquid crystal panel is enabled to realize high contrast at high speed. The VA liquid crystal panel ideally displays normally black, that is to say, displays a black color in a voltage non-applied state. Actually, light leakage is generated at a voltage non-applied time, and reproducibility of the black color declines. This sometimes leads to a decline in contrast.

Especially in the VA liquid crystal panel, in the voltage non-applied state, a liquid crystal is pre-tilted, that is to say, the liquid crystal is preliminarily tilted with respect to the vertical direction of the substrate, due to the pre-tilt, a phase shift is generated in light having passed through the liquid crystal panel, and due to the phase shift, light leakage is promoted.

Here, on a simulation basis, a VA liquid crystal panel having a fixed thickness and including a pre-tilted liquid crystal can be modeled as a tilted positive C-plate (medium having a large refractive index in a thickness direction). Therefore, for compensating for a phase shift generated in the VA liquid crystal panel, it is effective to arrange an optical compensating plate including a negative C-plate (medium having a small refractive index in the thickness direction), with being tilted in the same direction as pre-tilt of the liquid crystal, and thereby cancel out a phase shift generated in the liquid crystal panel, by a phase shift generated in the optical compensating plate.

Note that the related prior arts include Patent Document 1 described below.

CITATION LIST

Patent Document

Patent Document 1: Japanese Patent Application Laid-Open No. 2009-229971

SUMMARY OF THE INVENTION

Problems to be Solved by the Invention

In a case where the above-described optical compensating plate serving as a negative C-plate is used, for appropriately compensating for a phase shift generated in a liquid crystal panel, it is necessary to tilt the optical compensating plate at a certain level of angle in accordance with a pre-tilt angle of a liquid crystal.

However, in a case where an optical compensating plate is arranged at an angle, it is necessary to secure a relatively-large arrangement space of the optical compensating plate. Specifically, it is necessary to secure a sufficient space for arranging the optical compensating plate between a liquid crystal panel and a polarization plate, which can possibly lead to upsizing of an optical system.

The present technology has been devised in view of the above-described circumstances, and aims to downsize an optical system by reducing a tilt angle of an optical compensating plate including a medium having a small refractive index in the thickness direction, in achieving a predetermined contrast.

Solutions to Problems

A liquid crystal display apparatus according to the present technology includes a vertical alignment liquid crystal panel, a first optical compensation unit including a medium having a small refractive index in a thickness direction, and being arranged with being tilted from a state parallel to the liquid crystal panel, at a position at which light having passed through the liquid crystal panel or not having passed through the liquid crystal panel enters, and a second optical compensation unit having refractive index aeolotropy at least in an in-plane direction, and being arranged at a position at which light having passed through the liquid crystal panel or not having passed through the liquid crystal panel enters.

In the above-described second optical compensation unit, because an in-plane phase difference is generated, a phase shift in the in-plane direction that is generated by the tilt of the first optical compensation unit (medium having a small refractive index in the thickness direction) being incomplete can be compensated for by the in-plane phase difference of the second optical compensation unit.

In the above-described liquid crystal display apparatus according to the present technology, it is desirable that a polarization element arranged between a light source and the liquid crystal panel on an optical path from the light source is included, and when a polarization direction of incident light from the polarization element to a side of the liquid crystal panel is regarded as an incident polarization direction, the second optical compensation unit is arranged in such a manner that a direction of a slow axis is substantially parallel to the incident polarization direction.

Therefore, a phase shift in the in-plane direction that is generated by the tilt of the first optical compensation unit being incomplete is favorably compensated for by the in-plane phase difference of the second optical compensation unit.

In the above-described liquid crystal display apparatus according to the present technology, it is desirable that the first optical compensation unit is arranged with being tilted in a same direction as a tilt direction of a liquid crystal of the liquid crystal panel from a state parallel to the liquid crystal panel.

Therefore, a phase compensation effect caused by the first optical compensating plate is enhanced.

In the above-described liquid crystal display apparatus according to the present technology, it is desirable that a tilt angle of the first optical compensation unit from the parallel state is set to an angle equal to or less than a pre-tilt angle of the liquid crystal panel.

Therefore, an optical system can be prevented from unnecessarily upsizing due to the tilt of the first optical compensation unit.

In the above-described liquid crystal display apparatus according to the present technology, it is desirable that the first and second optical compensation units are arranged in such a manner that light having passed through the liquid crystal panel passes through the first optical compensation unit, and the second optical compensation unit in this order.

Therefore, light having been subjected to phase compensation performed by the first optical compensating unit passes through the second optical compensating unit. It has been confirmed by experiment that a phase compensation effect is enhanced by causing light having passed through the liquid crystal, to enter the second optical compensating unit after compensation is performed by first optical compensating unit, rather than causing the light to enter the second optical compensating unit without performing compensation.

In the above-described liquid crystal display apparatus according to the present technology, it is desirable that the second optical compensation unit includes inorganic material.

Therefore, light resistance and heat resistance of the second optical compensation unit can be improved.

In the above-described liquid crystal display apparatus according to the present technology, it is desirable that, when axes orthogonal to each other in an in-plane direction are defined as an x-axis and a y-axis, and an axis parallel to a thickness direction is defined as a z-axis, in the second optical compensation unit, a refractive index in an x-axis direction becomes largest, and refractive indices in a y-axis direction and a z-axis direction are different.

According to the above-described configuration, as the second optical compensation unit including inorganic material, the need for equalizing refractive indices in the y-axis direction and the z-axis direction is eliminated.

In the above-described liquid crystal display apparatus according to the present technology, it is desirable that the first optical compensation unit and the second optical compensation unit are formed as separate optical compensating plates.

Therefore, the second optical compensation unit can avoid being arranged with being tilted together with the first optical compensation unit.

In the above-described liquid crystal display apparatus according to the present technology, it is desirable that the second optical compensation unit is arranged parallel to the liquid crystal panel.

Therefore, a phase compensation effect of the second optical compensation unit for a phase shift in the in-plane direction that is generated by the tilt of the first optical compensation unit being incomplete is enhanced.

In the above-described liquid crystal display apparatus according to the present technology, it is desirable that the first optical compensation unit and the second optical compensation unit are formed as an integrated optical compensating plate.

Therefore, an arrangement interval of the first optical compensation unit and the second optical compensation unit can be narrowed.

In the above-described liquid crystal display apparatus according to the present technology, it is desirable that the liquid crystal panel is a reflective liquid crystal panel, a polarization element arranged between a light source and the liquid crystal panel on an optical path from the light source is included, and the first and second optical compensation units are arranged between the polarization element and the liquid crystal panel.

Therefore, in a case where a configuration of a reflective liquid crystal that reflects light having passed through a liquid crystal layer, using a mirror, and lets the light through the liquid crystal layer again is employed, the first and second optical compensation units can avoid being arranged between the liquid crystal layer and the mirror. In other words, there is no need to provide a mirror separately from the liquid crystal panel, and arrange first and second optical compensation units therebetween.

In the above-described liquid crystal display apparatus according to the present technology, it is desirable that a rotation adjustment mechanism configured to adjust a rotation angle of the second optical compensation unit about an axis substantially parallel to either a thickness direction of the second optical compensation unit or a thickness direction of the liquid crystal panel is included.

By providing such a rotation adjustment mechanism, rotation angle adjustment of the second optical compensation unit for improving contrast is simplified.

In the above-described liquid crystal display apparatus according to the present technology, it is desirable that the medium included in the first optical compensation unit has a multi-layer film structure including inorganic material.

Therefore, the first optical compensation unit can be created by alternately stacking high refractive index material and low refractive index material.

Furthermore, a display method according to the present technology performs image display by projecting light from a light source via a vertical alignment liquid crystal panel, a first optical compensation unit including a medium having a small refractive index in a thickness direction, and being arranged with being tilted from a state parallel to the liquid crystal panel, at a position at which light having passed through the liquid crystal panel or not having passed through the liquid crystal panel enters, and a second optical compensation unit having refractive index aeolotropy at least in an in-plane direction, and being arranged at a position at which light having passed through the liquid crystal panel or not having passed through the liquid crystal panel enters.

Also by such a display method, effects similar to those of the above-described liquid crystal display apparatus according to the present technology can be obtained.

Effects of the Invention

According to the present technology, an optical system can be downsized by reducing a tilt angle of an optical compensating plate including a medium having a small refractive index in the thickness direction, in achieving a predetermined contrast.

Note that the effect described here is not necessarily limited, and may be any effect described in the present disclosure.

BRIEF DESCRIPTION OF DRAWINGS

FIG. 6 is an explanatory diagram illustrating a modeled specific example of optical compensation performed by the first optical compensating plate.

FIG. 8 illustrates three side views of a liquid crystal panel, a first optical compensating plate, and a second optical compensating plate that are illustrated in FIG. 7.

FIG. 9 is an explanatory diagram illustrating an A-plate.

FIG. 10 is a diagram schematically illustrating an example of refractive index aeolotropy of the second optical compensating plate according to an embodiment.

FIG. 11 is a diagram for describing a configuration example of an optical compensation unit according to a second embodiment.

FIG. 12 is a diagram illustrating a result of experiment of a phase compensation effect obtained by an optical compensation unit according to the second embodiment.

FIG. 13 is a diagram illustrating an experiment result of a direction of an optical axis of a second phase difference layer (second optical compensation unit) according to the second embodiment.

FIG. 14 is a diagram illustrating an experiment result of a phase compensation effect in a case where a tilt angle of a second optical compensating plate is set to 0 degree in a configuration in which a first optical compensating plate and the second optical compensating plate are separately formed.

MODE FOR CARRYING OUT THE INVENTION

Hereinafter, embodiments according to the present technology will be described in the following order with reference to the attached drawings.
<1. First Embodiment>
[1-1. Configuration of Liquid Crystal Display Apparatus]
[1-2. Phase Compensation According to First Embodiment]
<2. Second Embodiment>
[2-1. Phase Compensation According to Second Embodiment]
[2-2. Experiment Result]
<3. Third Embodiment>
<4. Fourth Embodiment>
<5. Conclusion of Embodiments>
<6. Modified Example>
<7. Present Technology>

1. First Embodiment 1-1. Configuration of Liquid Crystal Display Apparatus

Figure 1:
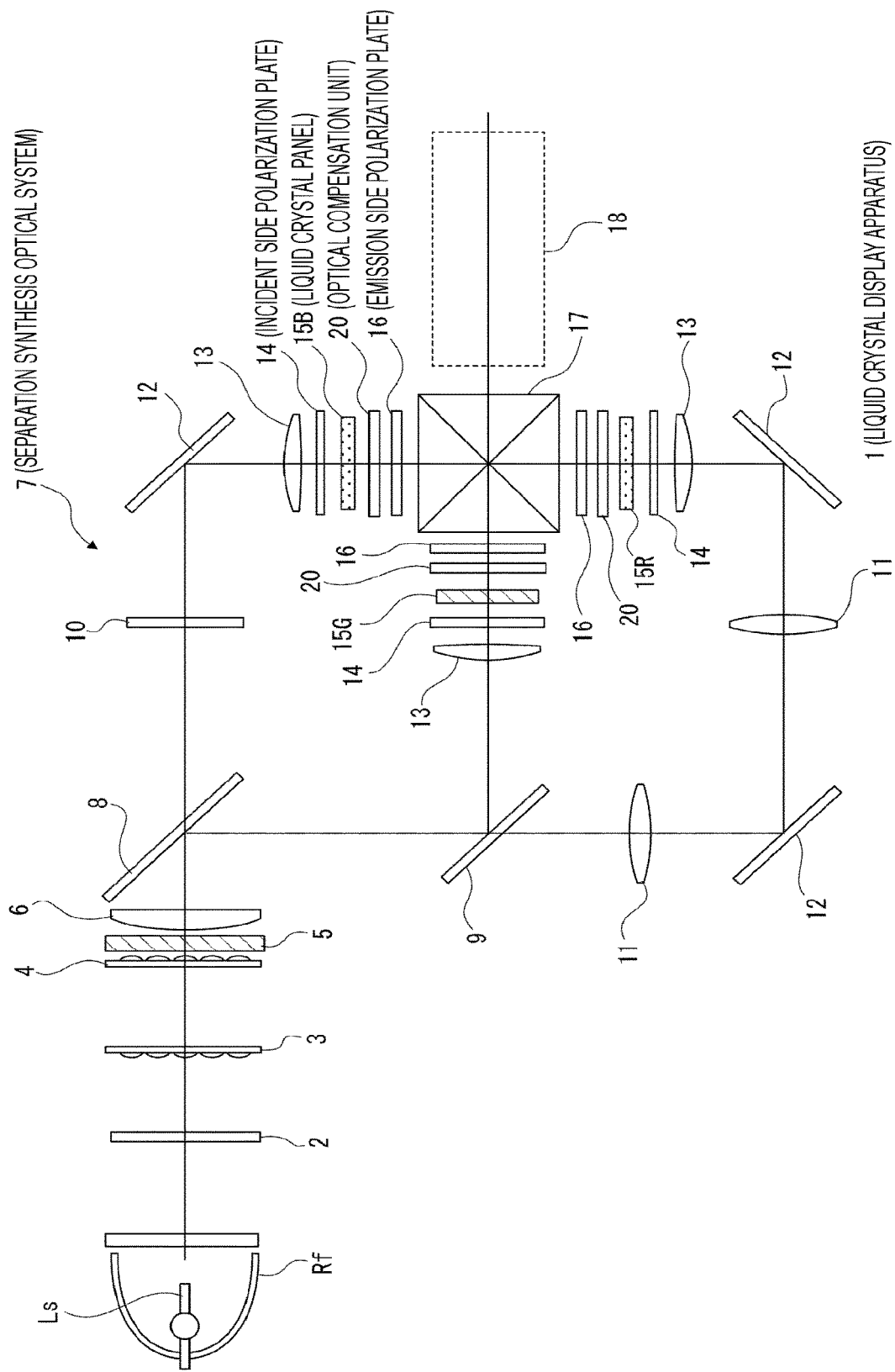
FIG. 1 is a diagram illustrating a configuration example of a liquid crystal display apparatus according to a first embodiment.

FIG. 1 is a diagram illustrating a configuration example of a liquid crystal display apparatus 1 according to an embodiment according to the present technology.

The liquid crystal display apparatus 1 is formed as a transmissive liquid crystal projector apparatus. Specifically, the liquid crystal display apparatus 1 is formed as a so-called 3 liquid crystal display (LCD) liquid crystal projector apparatus including liquid crystal panels respectively corresponding to red (R) color, green (G) color, and blue (B) color.

As illustrated in the drawing, the liquid crystal display apparatus 1 includes a light source Ls, a reflector Rf, a filter 2, a fly-eye lens 3, a fly-eye lens 4, a polarization conversion element 5, a condenser lens 6, a separation synthesis optical system 7, and a projector lens (projection optical system) 18.

For example, a high intensity discharge (HID) lamp, a light emitting diode (LED), a laser, or the like can be used as the light source Ls. The drawing exemplifies a configuration in which the reflector Rf is provided to correspond to a case where an HID lamp is used as the light source Ls, but the reflector Rf needs not be provided in a case where an LED or a laser is used.

The light source Ls is arranged at a focal position of the reflector Rf, and light emitted from the light source Ls is reflected by the reflector Rf and emitted as substantially parallel light.

Emitted light from the light source Ls that has been reflected by the reflector Rf and emitted as substantially parallel light as described above passes through the filter 2 that cuts off infrared light and ultraviolet light, and then, enters the polarization conversion element 5 via the fly-eye lens (first fly-eye lens) 3 and the fly-eye lens (second fly-eye lens) 4.

The fly-eye lens 3 and the fly-eye lens 4 function as lenses for uniformizing illuminance of light entering liquid crystal panels 15 (15R, 15G, 15B) which will be described later.

The polarization conversion element 5 aligns polarizing axes of emitted light to a predetermined direction. In this example, light including s-polarized light and p-polarized light enters, and s-polarized light is emitted.

Emitted light of the polarization conversion element 5 enters the separation synthesis optical system 7 via the condenser lens 6. Emitted light of the polarization conversion element 5 enters the condenser lens 6 and the condenser lens 6 condenses the light.

The separation synthesis optical system 7 separates color of emitted light of the condenser lens 6 into red color, green color, and blue color (RGB), performs spatial light modulation of light of each color by a liquid crystal panel 15 of a corresponding color among the liquid crystal panels 15R, 15G, and 15B, and then, synthesizes the modulated light, and forms a projection image by the synthesized light.

The separation synthesis optical system 7 includes a dichroic mirror 8, a dichroic mirror 9, a filter 10, a relay lens 11, a mirror 12, a relay lens 13, an incident side polarization plate 14, the liquid crystal panels 15, an emission side polarization plate 16, an optical compensation unit 20, and a color (light) synthesis prism 17. As the liquid crystal panels 15, transmissive liquid crystal panels are used, and three liquid crystal panels 15 including a liquid crystal panel 15R for performing spatial light modulation of light in a red wavelength band (hereinafter, described as "R light"), a liquid crystal panel 15G for performing spatial light modulation of light in a green wavelength band (hereinafter, described as "G light"), and a liquid crystal panel 15B for performing spatial light modulation of light in a blue wavelength band (hereinafter, described as "B light") are provided.

In the separation synthesis optical system 7, a set of the incident side polarization plate 14, the optical compensation unit 20, and the emission side polarization plate 16 is provided for each of these liquid crystal panels 15R, 15G, and 15B.

The dichroic mirror 8 and the dichroic mirror 9 selectively let through or reflect each light of R light, G light, and B light depending on the wavelength band. The dichroic mirror 8 lets through B light and reflects R light and G light. R light and G light that have been reflected by the dichroic mirror 8 enter the dichroic mirror 9, and the dichroic mirror 9 lets through the R light and reflects the G light.

In this manner, emitted light of the condenser lens 6 is color-separated into three colors of RGB.

As illustrated in the drawing, B light having passed through the dichroic mirror 8 passes through the filter 10 and then is reflected by the mirror 12, and enters the incident side polarization plate 14 provided to correspond to the liquid crystal panel 15B, via a condenser lens 13.

G light having been reflected by the dichroic mirror 9 enters the incident side polarization plate 14 provided to correspond to the liquid crystal panel 15G, via the condenser lens 13.

R light having passed through the dichroic mirror 9 passes through the relay lens 11 and is reflected by the mirror 12, and then, enters the incident side polarization plate 14 provided to correspond to the liquid crystal panel 15R, via the relay lens 11 and the condenser lens 13.

Each light of RGB that has been color-separated in this manner enters a liquid crystal panel 15 of a corresponding color among the liquid crystal panels 15R, 15G, and 15B via the incident side polarization plate 14 of the corresponding color.

Each light of RGB that has passed through a corresponding one of the liquid crystal panels 15R, 15G, and 15B is optically compensated (phase shift thereof is compensated) by the optical compensation unit 20, which will be described later, and then, enters the emission side polarization plate 16. Light emitted from the emission side polarization plate 16 is adjusted in light amount depending on the degree of light modulation performed by the liquid crystal panel 15.

The color synthesis prism 17 is configured to emit G light onto the projector lens 18 by letting through G light, and emit R light and B light onto the projector lens 18 by reflecting R light and B light. The color synthesis prism 17 is formed by bonding a plurality of glass prisms (four isosceles right prisms having substantially the same shape), for example, and two interference filters having a predetermined optical characteristic are formed on a bonded surface of the glass prisms. A first interference filter reflects B light and lets through R light and G light. A second interference filter reflects R light and lets through G light and B light. Accordingly, respective light rays of RGB that have been optically modulated by the liquid crystal panels 15R, 15G, and 15B are synthesized by the color synthesis prism 17 and enter the projector lens 18.

The projector lens 18 enlarges magnification of emitted light from the separation synthesis optical system 7 to a predetermined magnification, and projects an image onto a projection target medium such as a screen.

Figure 2:
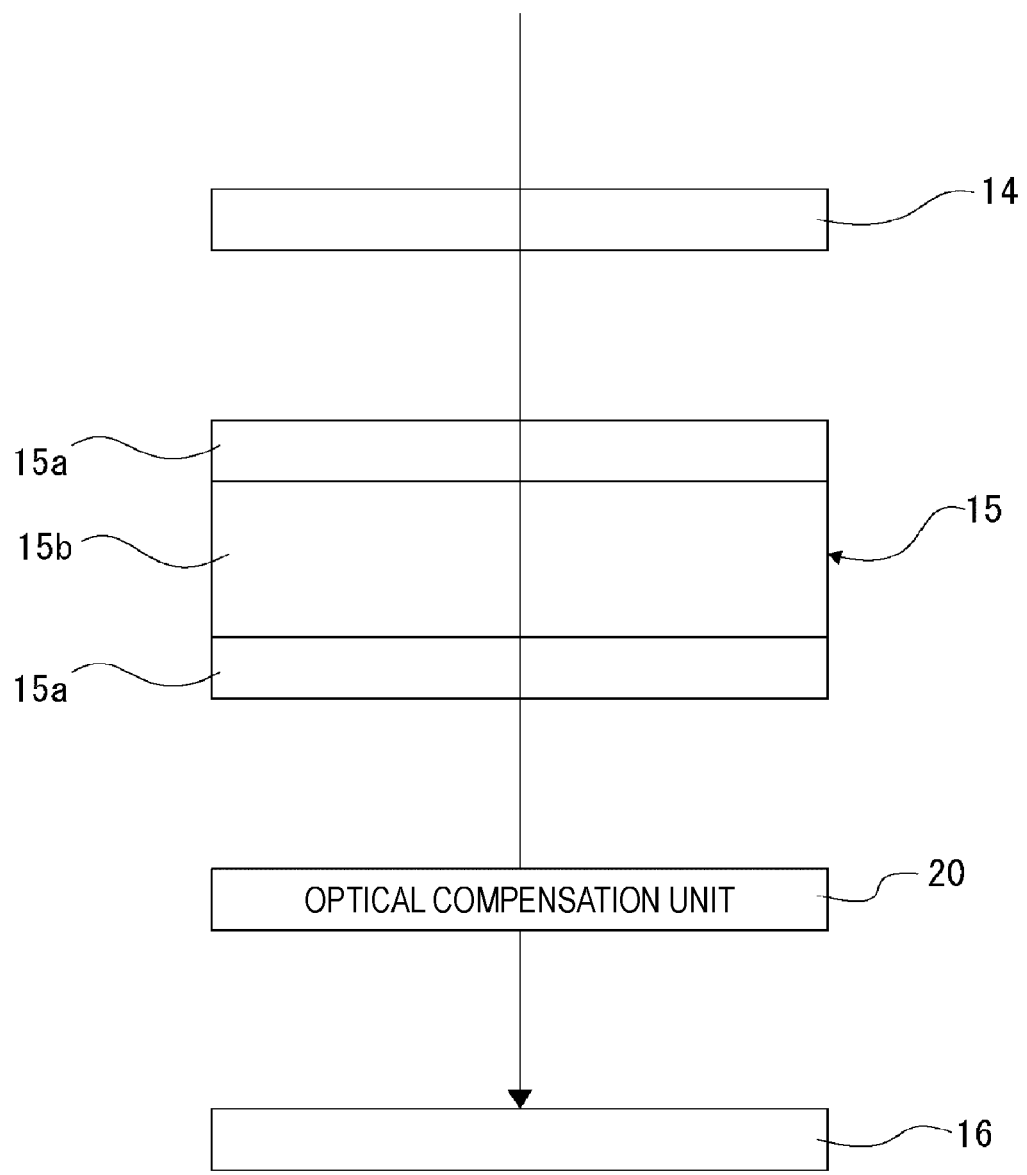
FIG. 2 is a diagram for describing a configuration example of a main part of the liquid crystal display apparatus according to the first embodiment.

FIG. 2 illustrates, in an enlarged manner, as a diagram for describing a configuration example of a main part of the liquid crystal display apparatus 1, a part of the separation synthesis optical system 7 from the incident side polarization plate 14 to the emission side polarization plate 16 that is provided for each color of RGB.

On an optical path of each light of RGB, the incident side polarization plate 14 and the emission side polarization plate 16 are arranged in a crossed-nicols state (state in which optical axes are orthogonal to each other). The liquid crystal panel 15 serving as a spatial light modulator and the optical compensation unit 20 are arranged between the incident side polarization plate 14 and the emission side polarization plate 16. In the present embodiment, the optical compensation unit 20 is arranged between the liquid crystal panel 15 and the emission side polarization plate 16.

Note that a plurality of emission side polarization plates 16 may exist. Furthermore, the incident side polarization plate 14 and the emission side polarization plate 16 may be organic polarization plates or may be inorganic polarization plates. Nevertheless, if the incident side polarization plate 14 and the emission side polarization plate 16 are inorganic polarization plates, even in a case where an amount of light from the light source Ls is large, such as a case where a laser is used as the light source Ls, it becomes possible to suppress transubstantiation (as compared with organic polarization plate), and longer operating life, reliability improvement, and the like are achieved.

The liquid crystal panel 15 includes a liquid crystal layer 15b arranged between a pair of substrates 15a and 15a, and functions as a spatial light modulator for transmitted light by changing the alignment of liquid crystals in the liquid crystal layer 15b, in accordance with an applied voltage.

The liquid crystal panel 15 of the present embodiment is a vertical alignment (VA) liquid crystal panel. The VA liquid crystal panel operates in a vertical alignment mode. In other words, the VA liquid crystal panel is arranged in such a manner that liquid crystal alignment becomes substantially vertical to the substrate 15a when voltage is not applied, and has a configuration in which liquid crystal alignment tilts with respect to the vertical direction (normal direction) of the substrate 15a when voltage is applied.

Figure 3:
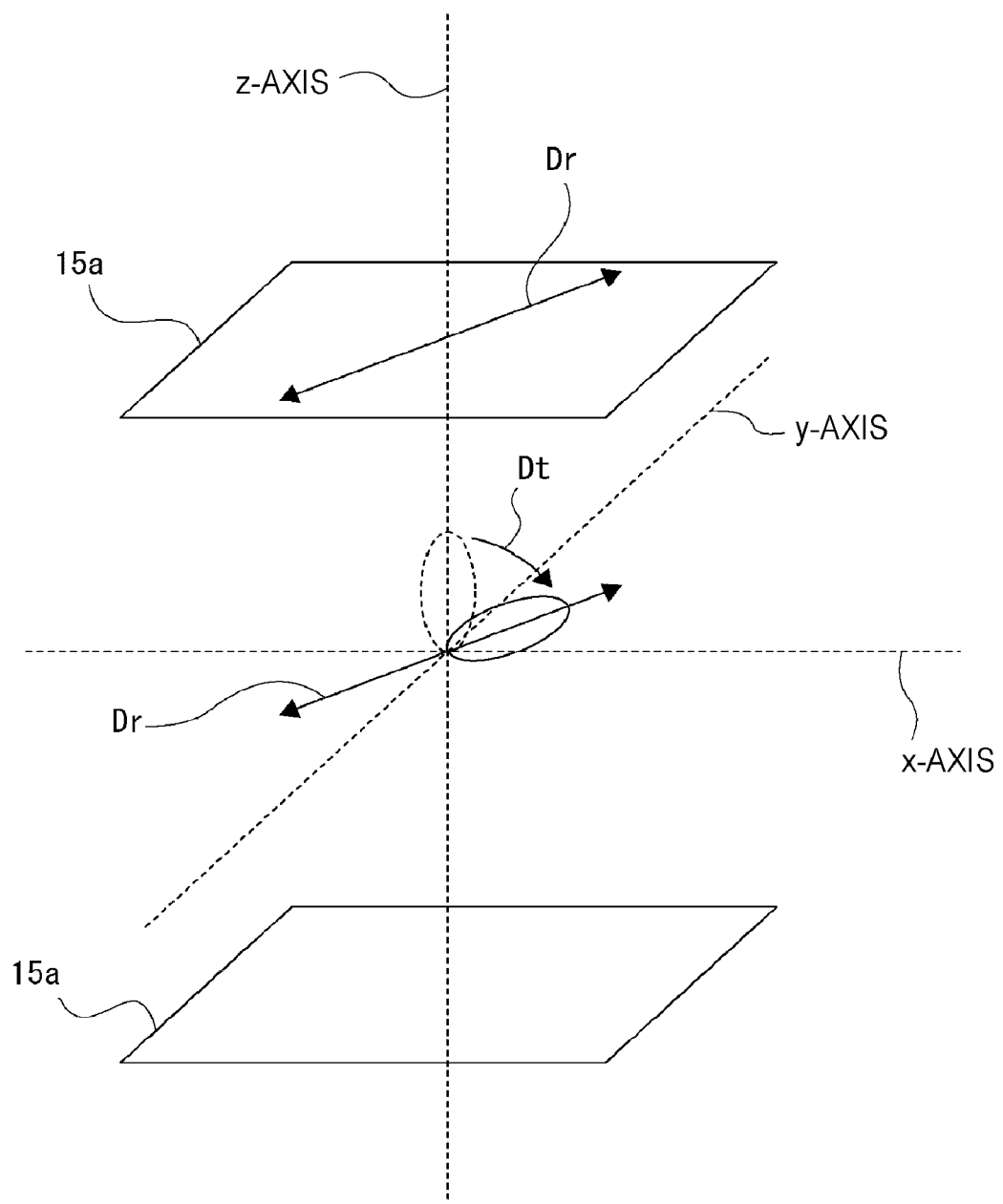
FIG. 3 is an explanatory diagram illustrating a tilt direction of a liquid crystal.

FIG. 3 is an explanatory diagram of a tilt direction of a liquid crystal in the VA liquid crystal panel.

First of all, as illustrated in the drawing, a direction vertical to the substrate 15a of the liquid crystal panel 15 is defined as a z-axis direction, and directions orthogonal to each other on a plane parallel to an in-plane direction of the substrate 15a are defined as an x-axis direction and a y-axis direction, respectively.

As described above, in the VA liquid crystal panel, liquid crystal alignment tilts with respect to the vertical direction of the substrate 15a when voltage is applied, but at this time, a direction in which liquid crystal molecules tilt is a direction extending along an alignment direction of an alignment film formed on the substrate 15a (hereinafter, described as a "rubbing direction Dr"). On an x-y plane, when the x-axis direction is set to 0-degree to 180-degree direction, and the y-axis direction is set to 90-degree to 270-degree direction, the rubbing direction Dr is set to 45-degree or 135-degree direction (in the drawing, an example in which the rubbing direction Dr=45 degrees is illustrated).

FIG. 3 illustrates a state of liquid crystal molecules before voltage is applied, using a broken line ellipsoid, and a state of liquid crystal molecules after voltage is applied, using a solid line ellipsoid. Hereinafter, a direction in which liquid crystal molecules tilt in accordance with voltage application in this manner (direction in which liquid crystal molecules rotate) will be described as a "tilt direction Dt".

In the liquid crystal panel 15, in a state of vertical alignment in which voltage is not applied to the liquid crystal layer 15b (at this time, pre-tilt to be described below is not considered), linear polarized light in the same polarization direction as linear polarized light (s-polarized light in this example) in a predetermined polarization direction that has entered from the incident side polarization plate 14 is emitted from the liquid crystal layer 15b onto the emission side polarization plate 16 via the optical compensation unit 20.

Because the emission side polarization plate 16 has a crossed-nicols relationship with the incident side polarization plate 14, a polarization direction of light entering via the liquid crystal layer 15b as described above is substantially orthogonal to a light transmission axis of the emission side polarization plate 16, and the light does not pass through the emission side polarization plate 16. In other words, by bringing pixels of the liquid crystal panel 15 into a voltage non-applied state, pixel information (black color) is displayed by the minimum gradation value.

On the other hand, in a state in which voltage is applied to the liquid crystal layer 15b, liquid crystal molecules tilt in the tilt direction Dt. At this time, by adjusting a voltage value of applied voltage, a tilt angle of liquid crystal molecules in the tilt direction Dt can be controlled.

If the applied voltage value is maximum, liquid crystal alignment becomes horizontal alignment (state in which liquid crystal molecules tilt by 90 degrees from the z-axis direction to the tilt direction Dt). In this state, a polarization direction of linear polarized light entering from the incident side polarization plate 14 is rotated by 90 degrees by double refraction of the liquid crystal layer 15b after the linear polarized light passes through the liquid crystal layer 15b, and the linear polarized light passes through the emission side polarization plate 16. Therefore, pixel information is displayed by the maximum gradation value.

In a state in which a voltage value is less than the maximum value, a tilt angle of liquid crystal molecules in the tilt direction Dt becomes less than 90 degrees. In this state, light having passed through the liquid crystal layer 15b includes both of a polarization component parallel to a polarization direction of incident light, and a polarization component orthogonal to the polarization direction (that is, becomes elliptically-polarized light). Among these two polarization components, only a polarization component parallel to the light transmission axis of the emission side polarization plate 16 is emitted from the emission side polarization plate 16. Accordingly, in this case, pixel information is displayed by an intermediate gradation value.

Here, in an actual liquid crystal panel 15, even when voltage is not applied, liquid crystal alignment is not completely vertical to the substrate 15a, and pre-tilt of about several degrees is given to the liquid crystal alignment.

Figure 4:
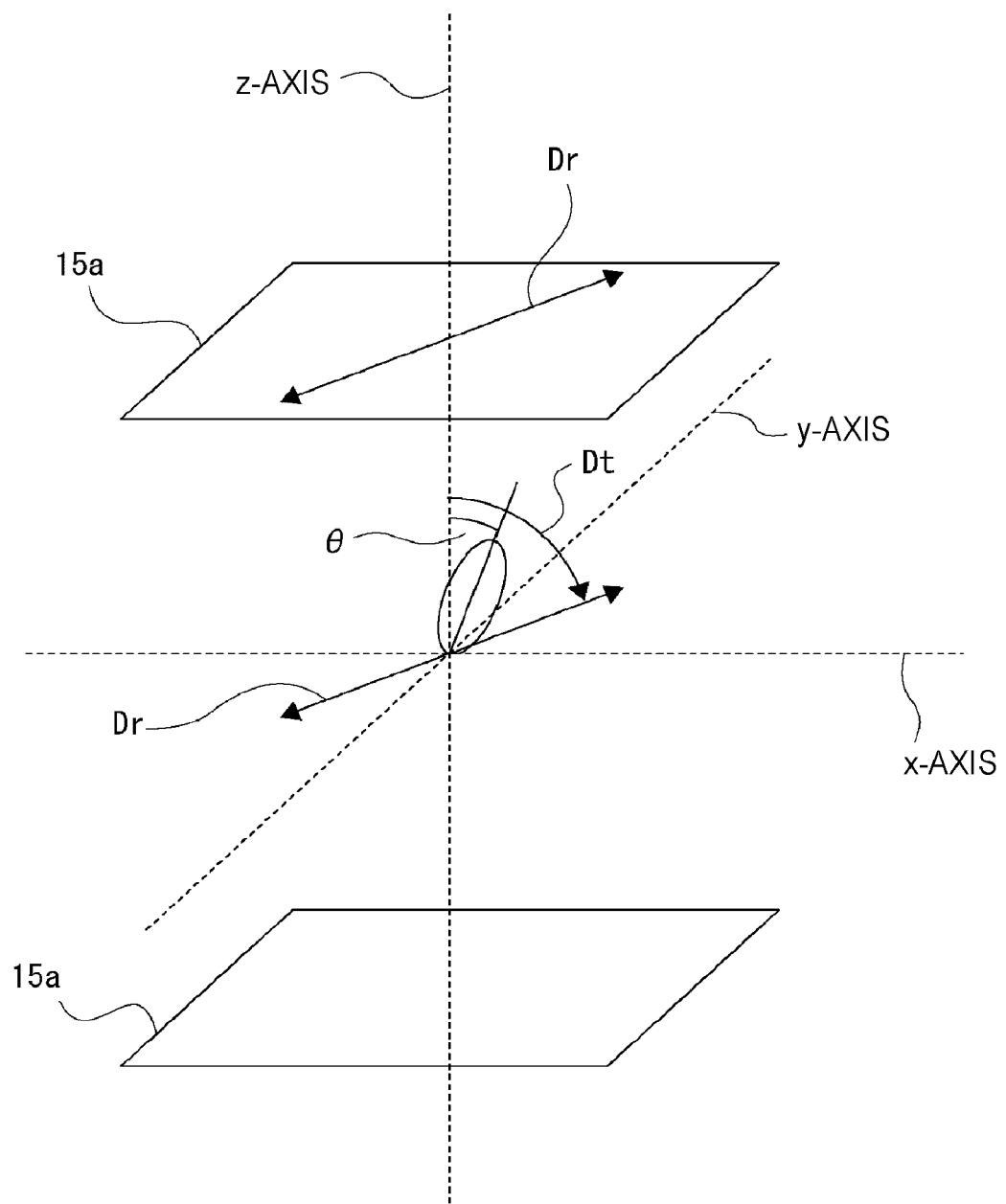
FIG. 4 is an explanatory diagram illustrating pre-tilt of a liquid crystal.

FIG. 4 is an explanatory diagram illustrating pre-tilt of a liquid crystal in the VA liquid crystal panel.

In the liquid crystal panel 15, in a state in which voltage is not applied, liquid crystal molecules in the liquid crystal layer 15b tilt by a predetermined angle $\theta$ from the z-axis direction to the tilt direction Dt. Hereinafter, a pre-tilt angle of a liquid crystal that is represented by this angle $\theta$ will be described as a "pre-tilt angle $\theta$".

By such pre-tilt, the generation of a reverse tilt domain in which liquid crystal molecules tilt in a reverse direction of a predetermined direction (tilt direction Dt) when voltage is applied is prevented.

If liquid crystal molecules are pre-tilted in this manner, in a voltage non-applied state, that is to say, when black display is performed, light having passed through the liquid crystal layer 15b includes not only a polarization component parallel to a polarization direction of incident light but also a polarization component orthogonal to the polarization direction. Therefore, a part of light having passed through the liquid crystal layer 15b passes through the emission side polarization plate 16, and the light becomes light leakage in black display, whereby a decline in contrast is invoked.

For preventing such light leakage in black display, it is effective to arrange the first optical compensating plate 21 including a medium equivalent to a negative C-plate, that is to say, a medium having a small refractive index in a thickness direction, in the optical compensation unit 20.

In this example, the first optical compensating plate 21 does not include a negative uniaxial crystal such as sapphire, and a multi-layer film structure including inorganic material that is formed on a transparent substrate such as glass, by coating such as sputtering or deposition, for example, is used as the first optical compensating plate 21. The above-described multi-layer film structure can be formed by alternately stacking dielectric material-based high refractive index material and low refractive index material.

Figure 5:
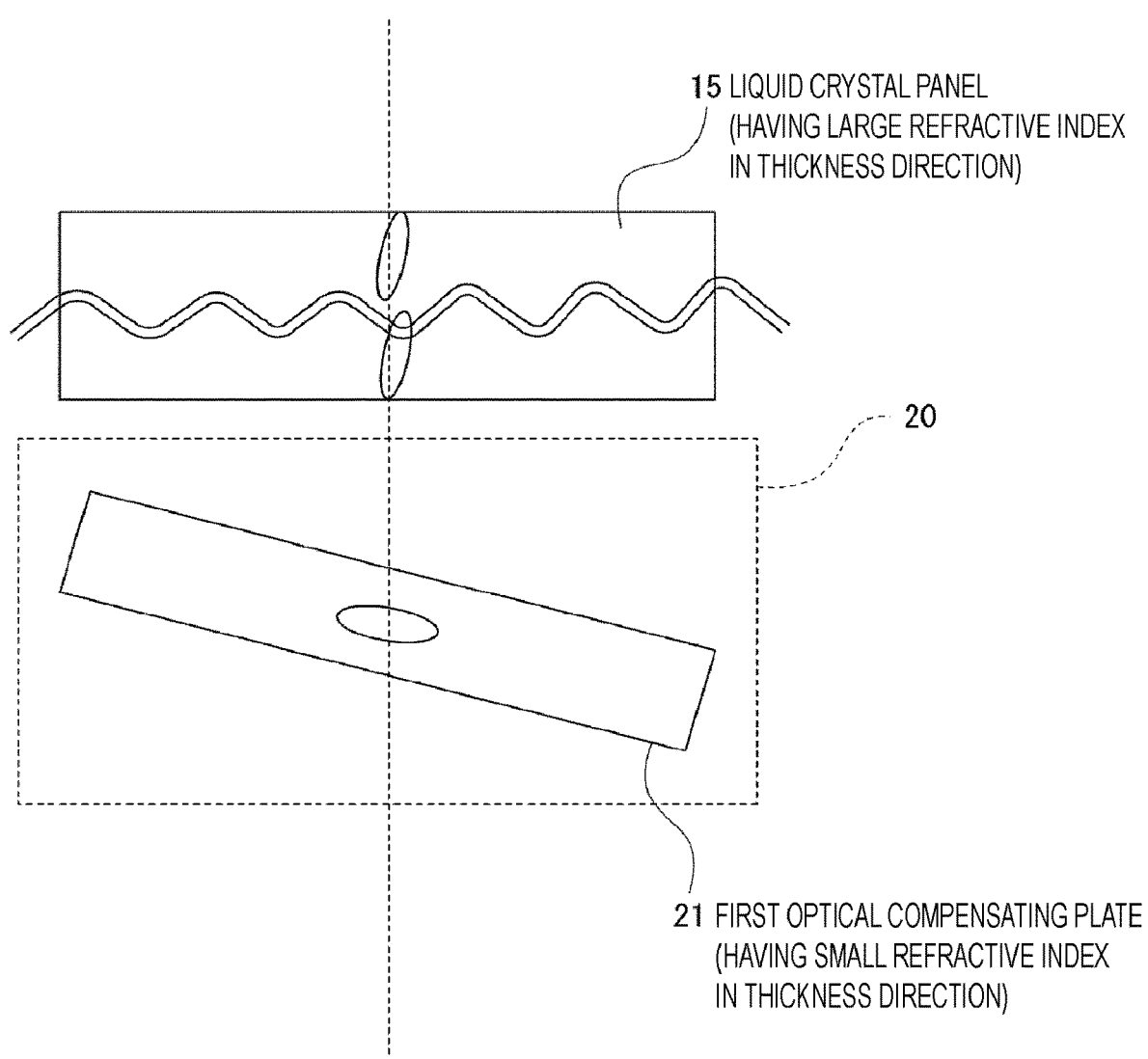
FIG. 5 is a diagram schematically illustrating a function of a refractive index ellipsoid of a liquid crystal layer and a function of a refractive index ellipsoid of a first optical compensating plate.

A function in a case where the first optical compensating plate 21 is provided will be described with reference to FIG. 5. Note that FIG. 5 schematically illustrates a function of a refractive index ellipsoid of the liquid crystal panel 15 (liquid crystal layer 15b), and a function of a refractive index ellipsoid of the first optical compensating plate 21.

First of all, because the liquid crystal layer 15b operates in the vertical alignment mode, the VA liquid crystal panel 15 can be modeled as a positive uniaxial crystal. That is, the liquid crystal panel 15 in which liquid crystal molecules tilt at the pre-tilt angle $\theta$ in a state in which voltage is not applied can be regarded as a tilted positive C-plate. Here, the positive C-plate refers to a medium having refractive index isotropy in a plane, and having a refractive index in the thickness direction that is larger than an in-plane refractive index (that is, a medium having a large refractive index in the thickness direction).

It is considered that the first optical compensating plate 21 including a medium having a small refractive index in the thickness direction is used for such a liquid crystal panel 15. Here, the medium having a small refractive index in the thickness direction can also be said to be a medium having refractive index isotropy in a plane, and having a refractive index in the thickness direction that is smaller than an in-plane refractive index.

The first optical compensating plate 21 having a small refractive index in the thickness direction generates a phase difference totally opposite in sign to the liquid crystal panel 15 serving as positive C-plate, when a light ray passes through. In other words, if the first optical compensating plate 21 is used in a tilted state, the first optical compensating plate 21 becomes equivalent to a tilted negative C-plate.

From these points, if the respective optical axes of the liquid crystal panel 15 and the first optical compensating plate 21 tilt in the same direction, a phase difference generated in the liquid crystal panel 15 and a phase difference generated in the first optical compensating plate 21 become opposite in sign. Accordingly, if the respective thicknesses are adjusted in such a manner that the respective absolute values of a phase difference generated in the liquid crystal panel 15 and a phase difference generated in the first optical compensating plate 21 become the same, and a phase shift is not generated between the incident side polarization plate 14 and the emission side polarization plate 16 that are in a crossed-nicols relationship, the phase difference generated in the liquid crystal panel 15 can be cancelled out by the phase difference generated in the first optical compensating plate 21.

In other words, by arranging the first optical compensating plate 21 with being tilted in the same direction as a pre-tilt direction (tilt direction Dt) of the liquid crystal panel 15 and adjusting the thickness, a phase difference generated in the liquid crystal panel 15 can be cancelled out.

Here, the description will be given using a further-easier-to-understand modeling.

FIG. 6 is an explanatory diagram illustrating a modeled specific example of optical compensation performed by the first optical compensating plate 21. FIG. 6A illustrates a modeled refractive index ellipsoid indicating the liquid crystal panel 15, that is to say, a modeled refractive index ellipsoid indicating a positive uniaxial crystal, and FIG. 6B illustrates a modeled refractive index ellipsoid indicating the first optical compensating plate 21, that is to say, a modeled refractive index ellipsoid having a small refractive index in the thickness direction, and FIG. 6C illustrates a modeled refractive index ellipsoid formed by adding up the refractive index ellipsoids illustrated in FIGS. 6A and 6B.

Note that in each diagram in FIGS. 6A to 6C, an X-axis, a Y-axis, and a Z-axis indicate three-dimensional directions of refractive index ellipsoids, and are different from the x-axis, the y-axis, and the z-axis illustrated in FIGS. 3 and 4 (three axes that are based on the in-plane direction and the thickness direction of the liquid crystal panel 15). Because liquid crystal molecules are pre-tilted in the liquid crystal panel 15 as described above, the Z-axis in FIG. 6A becomes an axis tilted by the pre-tilt angle C in the tilt direction Dt with respect to the z-axis. The Z-axis in FIG. 6B corresponds to the Z-axis in FIG. 6A. This means that the first optical compensating plate 21 is tilted in the same direction (same rotation direction) as a pre-tilt direction with respect to a state parallel to the liquid crystal panel 15. Specifically, this means that the first optical compensating plate 21 is tilted by the pre-tilt angle θ in the tilt direction Dt with respect to a state parallel to the liquid crystal panel 15.

In FIG. 6A, in the liquid crystal panel 15, that is to say, a refractive index ellipsoid indicating a positive uniaxial crystal, refractive indices no of ordinary rays in the X-axis and Y-axis directions are equal to each other, and a refractive index ne of an extraordinary ray in the Z-axis direction is larger than a refractive index no of an ordinary ray (no<ne). When refractive indices n in the respective directions of the X-axis, the Y-axis, and the Z-axis are denoted by "nX", "nY", and "nZ", respectively, this can be described as "nZ>nX=nY".

In the refractive index ellipsoid of the first optical compensating plate 21 that is illustrated in FIG. 6B, refractive indices no of ordinary rays in the X-axis and Y-axis directions are equal to each other, and a refractive index ne of an extraordinary ray in the Z-axis direction is smaller than a refractive index no of an ordinary ray (no>ne). In other words, in the relationship between the refractive indices "nX", "nY", and "nZ" in the respective directions of the X-axis, the Y-axis, and the Z-axis, this can be described as "nZ<nX=nY".

If these refractive index ellipsoids illustrated in FIGS. 6A and 6B are added up, as illustrated in FIG. 6C, a refractive index ellipsoid apparently becomes isotropic ("nZ=nX=nY"), refractive indices of an ordinary ray and an extraordinary ray become equal (no=ne) for light from any direction, and a phase difference is not generated. At this time, each phase difference amount is determined by "Δn (difference between ne and no)×thickness", but because Δn is defined by a physical characteristic value, an amount of a phase difference can be defined by the adjustment of the thickness.

1-2. Phase Compensation According to First Embodiment

As described above, by arranging the first optical compensating plate 21 including a medium having a small refractive index in the thickness direction, with being tilted in the same direction as a pre-tilt direction of the liquid crystal panel 15, and adjusting the thickness, a phase shift generated in the liquid crystal panel 15 can be cancelled out.

However, for appropriately compensating for a phase shift generated in the liquid crystal panel 15, it is necessary to tilt the first optical compensating plate 21 at a certain level of angle in accordance with a pre-tilt angle θ of a liquid crystal.

In the actual liquid crystal display apparatus 1, for the convenience of setting, it is sometimes difficult to secure a clearance gap in which the first optical compensating plate 21 is arranged at an angle for obtaining a sufficient phase compensation effect, between the liquid crystal panel 15 and a polarization plate (emission side polarization plate 16 or incident side polarization plate 14). Furthermore, tilting the first optical compensating plate 21 relatively drastically leads to upsizing of an optical system, which is originally undesirable.

Figure 7:
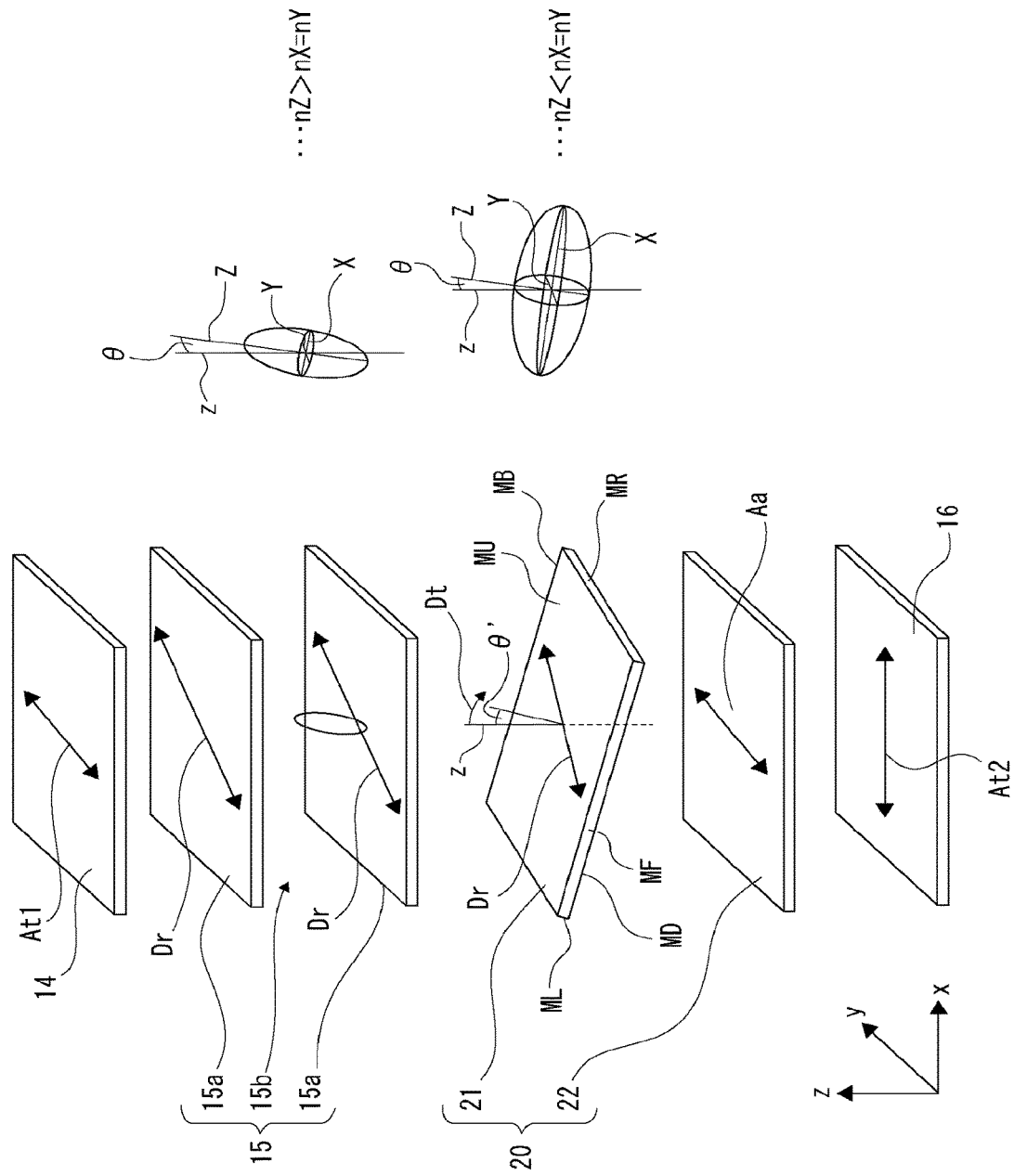
FIG. 7 is a diagram for describing a configuration example of an optical compensation unit according to the first embodiment.

In view of the foregoing, in the present embodiment, the optical compensation unit 20 has a configuration illustrated in FIG. 7

As illustrated in FIG. 7, in the optical compensation unit 20 of this example, a second optical compensating plate 22 is arranged together with the first optical compensating plate 21. In this example, the second optical compensating plate 22 is positioned between the first optical compensating plate 21 and the emission side polarization plate 16.

Note that, in the drawing, light transmission axes of the incident side polarization plate 14 and the emission side polarization plate 16 are described as "At1" and "At2", respectively.

Also in this example, the first optical compensating plate 21 is arranged in a state of being tilted in the same direction as the tilt direction Dt. Nevertheless, a tilt angle at this time, that is to say, a tilt angle of the first optical compensating plate 21 in the tilt direction Dt from a state parallel to the liquid crystal panel 15 (hereinafter, described as a "tilt angle θ'") is desirably made as small as possible for avoiding upsizing of an optical system.

Note that the tilt angle θ' can also be said to be a tilt angle with respect to the vertical direction (thickness direction) of the liquid crystal panel 15.

The tilt angle θ' is set to be equal to or less than the pre-tilt angle θ of the liquid crystal panel 15. Preferably, the tilt angle θ' is set to 3 degrees or less, and in this example, tilt angle θ'=3 degrees is set.

Here, for confirmation, the tilt of the first optical compensating plate 21 will be described with reference to FIGS. 7 and 8.

First of all, in this example, the liquid crystal panel 15 is a panel having a landscape substantially-rectangular shape, and a side extending in a direction corresponding to a horizontal line direction is a long side, and a side extending in a direction corresponding to a vertical line direction is a short side. Similarly to the liquid crystal panel 15, in this example, the first optical compensating plate 21 and the second optical compensating plate 22 also have a landscape substantially-rectangular shape.

In a perspective view in FIG. 7, among four side surfaces of the first optical compensating plate 21 (surfaces parallel to the thickness direction), one of a pair of side surfaces parallel to the long sides is described as a front surface MF, and a surface on the opposite side is described as a back surface MB. Furthermore, out of two upper and lower surfaces of the first optical compensating plate 21 (surfaces orthogonal to each side surface), a surface facing the liquid crystal panel 15 is described as an upper surface MU, and a surface on the opposite side (surface facing the second optical compensating plate 22) is described as a lower surface MD. Moreover, out of two side surfaces parallel to the short sides, a surface positioned on the left side when being observed from a viewpoint facing the front surface MF is described as a left surface ML, and a surface positioned on the right side is described as a right surface MR.

FIG. 8 illustrates three side views of the liquid crystal panel 15, the first optical compensating plate 21, and the second optical compensating plate 22 that are illustrated in FIG. 7. FIG. 8A illustrates left side views, FIG. 8B illustrates front views, and FIG. 8C illustrates right side views.

As illustrated in FIG. 8B, from the front side, the front surface MF and the lower surface MD of the first optical compensating plate 21 are mainly observed. This is because the back surface MB is positioned inferior to the front surface MF by the tilt in the same direction as the tilt direction Dt. As illustrated in FIG. 8A, from the left side, the left surface ML and the lower surface MD of the first optical compensating plate 21 are mainly observed, and as illustrated in FIG. 8C, from the right side, the right surface MR and the upper surface MU of the first optical compensating plate 21 are mainly observed.

Note that, as for a tilting direction of the first optical compensating plate 21, the same direction as the tilt direction Dt can also be said to be a direction in which the Z-axis direction of a refractive index ellipsoid in the first optical compensating plate 21 and the rubbing direction Dr exist on the same plane in the thickness direction of the liquid crystal panel 15.

Subsequently, the second optical compensating plate 22 will be described.

As the second optical compensating plate 22, an optical compensating plate having refractive index aeolotropy conforming to a so-called A-plate is used. Specifically, as the second optical compensating plate 22, an optical compensating plate having refractive index aeolotropy at least in an in-plane direction is used.

Here, an A-plate commonly in practical use is created by extending a film including organic material. Specifically, as schematically illustrated in FIG. 9A, an A-plate is created by stretching transparent polymers in a direction going straight to the thickness direction, by extending a transparent polymer film in one direction. Therefore, transparent polymers in a stretched state are arrayed in the film.

FIG. 9B schematically illustrates a characteristic of an A-plate using a refractive index ellipsoid.

An A-plate created as described above has an optical axis (slow axis) in the extending direction.

As illustrated in the drawing, in the A-plate, refractive indices no of ordinary rays in the Z-axis and Y-axis directions are equal to each other, and a refractive index ne of an extraordinary ray in the X-axis direction is larger than a refractive index no of an ordinary ray (no<ne). In other words, refractive index aeolotropy of the A-plate can be represented as "nX>nZ=nY".

Because a refractive index nX in the X-axis direction and a refractive index nY in the Y-axis direction are different from each other in the in-plane direction, such an A-plate can be said to have refractive index aeolotropy in the in-plane direction.

Nevertheless, because an A-plate includes organic material, there is a concern about temporal transubstantiation. In view of the foregoing, in this example, the second optical compensating plate 22 includes inorganic material.

Coating such as deposition or sputtering, for example, can be performed on a phase difference layer having a slow axis in the X-axis direction.

In a case where a phase difference layer of the second optical compensating plate 22 is created by the coating of inorganic material, generally, refractive indices can be easily differentiated between the X-axis direction and the Z-axis direction, but it is difficult to equalize refractive indices in the X-axis and the y-axis directions while differentiating refractive indices between the X-axis direction and the Z-axis direction. In other words, it is difficult to realize uniaxial refractive index aeolotropy represented by "nX>nZ=nY" like an A-plate.

In view of the foregoing, in this example, an optical compensating plate having biaxial refractive index aeolotropy is used as the second optical compensating plate 22.

Specifically, as illustrated in FIGS. 10A and 10B, the second optical compensating plate 22 having refractive index aeolotropy represented by "nX>nZ>nY" or "nX>nY>nZ" is used.

Therefore, the second optical compensating plate 22 having refractive index aeolotropy at least in the in-plane direction can be easily realized using inorganic material.

Here, in light having passed through a pre-tilted liquid crystal, a phase difference is generated also in a direction orthogonal to the vertical direction of the liquid crystal panel 15, that is to say, also in the in-plane direction of the liquid crystal panel 15. In a case where the tilt angle θ' of the first optical compensating plate 21 serving as a negative C-plate is insufficient, such a phase difference in the in-plane direction cannot be compensated for sufficiently.

Actually, incident light to the liquid crystal panel 15 has an incident angle of about 0 to 30 degrees, and there is no need to perform phase compensation on light having an incident angle of 30 degrees or more. If such an actual incident angle is considered, it is important to cancel out an in-plane phase difference generated when the liquid crystal panel 15 is viewed from a viewpoint facing a light incidence surface (that is, surface facing the incident side polarization plate 14) (hereinafter, described as an "in-plane phase difference viewed from an incidence surface front viewpoint").

As described above, because the second optical compensating plate 22 has refractive index aeolotropy in the in-plane direction, by appropriately arranging the second optical compensating plate 22, it becomes possible to cancel out the above-described in-plane phase difference viewed from the incidence surface front viewpoint.

The in-plane phase difference viewed from the incidence surface front viewpoint will be specifically considered.

As described above, in this example, by tilting the first optical compensating plate 21 in the pre-tilt direction (tilt direction Dt) with respect to a liquid crystal pre-tilted in the rubbing direction Dr of 45 degrees (or 135 degrees), an isotropic shape is apparently realized. At this time, the tilted first optical compensating plate 21 can be apparently regarded as having a slow axis in a direction of 135 degrees (or 45 degrees) orthogonal to the rubbing direction Dr.

In this manner, from the standpoint of the in-plane phase difference viewed from the incidence surface front viewpoint, because a slow axis of a pre-tilted liquid crystal can be regarded as 45 degrees (or 135 degrees), and a slow axis of the tilted first optical compensating plate 21 can be regarded as 135 degrees (or 45 degrees), for keeping balance between the pre-tilt and the first optical compensating plate 21 by the second optical compensating plate 22, it is considered that it is effective to arrange the second optical compensating plate 22 in such a manner that an optical axis Aa (X-axis of refractive index ellipsoid: slow axis) extends in a direction shifted by 45 degrees from the slow axis of the liquid crystal and the slow axis of the first optical compensating plate 21 (that is, 90-degree direction or 180-degree direction).

According to a result obtained by performing simulation and experiment, good contrast performance was obtained when the optical axis Aa of the second optical compensating plate 22 is extended toward a side of the 90-degree direction (that is, a direction parallel to the y-axis). In other words, by extending the optical axis Aa in a direction substantially parallel to a polarization direction of incident light from the incident side polarization plate 14 to the liquid crystal panel 15 (that is, a direction substantially parallel to the light transmission axis At1 of the incident side polarization plate 14), the second optical compensating plate 22 can favorably compensate for a phase shift in the in-plane direction that is generated by the tilt of the first optical compensating plate 21 being incomplete.

Note that the direction parallel to the polarization direction of incident light to the liquid crystal panel 15 can also be said to be a direction parallel to a light absorption axis of the emission side polarization plate 16.

As a supplementary statement for confirmation, the "parallel" means parallel viewed from the incidence surface front viewpoint.

On the basis of the above-described idea, in the liquid crystal display apparatus 1 of this example, the second optical compensating plate 22 provided separately from the first optical compensating plate 21 is arranged in such a manner that the optical axis Aa extends in a direction substantially parallel to the light absorption axis of the emission side polarization plate 16 (refer to FIG. 7).

In this example, the second optical compensating plate 22 is not tilted in the tilt direction Dt like the first optical compensating plate 21, but arranged parallel to the liquid crystal panel 15. In other words, a tilt angle of the second optical compensating plate 22 from a state parallel to the liquid crystal panel 15 is 0 degree.

Therefore, because the second optical compensating plate 22 is not tilted excessively with respect to a light axis, it is possible to enhance a phase compensation effect of the second optical compensating plate 22 for a phase shift in the in-plane direction that is generated by the tilt of the first optical compensating plate 21 being incomplete.

Furthermore, in this example, the first optical compensating plate 21 and the second optical compensating plate 22 are arranged between the incident side polarization plate 14 and the emission side polarization plate 16 in such a manner that the first optical compensating plate 21 is positioned closer to the liquid crystal panel 15 side and the second optical compensating plate 22 is positioned closer to the emission side polarization plate 16 side. That is, the first optical compensating plate 21 and the second optical compensating plate 22 are arranged in such a manner that light having passed through the liquid crystal panel 15 passes through the first optical compensating plate 21 and the second optical compensating plate 22 in this order.

Therefore, light having been subjected to phase compensation performed by the first optical compensating plate 21 passes through the second optical compensating plate 22.

It has been confirmed by the experiment that a phase compensation effect is enhanced by causing light having passed through the liquid crystal, to enter the second optical compensating plate 22 after compensation is performed by first optical compensating plate 21, rather than causing the light to enter the second optical compensating plate 22 without performing compensation. Accordingly, a contrast improving effect can be enhanced by the above-described arrangement of the first optical compensating plate 21 and the second optical compensating plate 22.

Nevertheless, for obtaining a phase compensation effect, it is only required that the first optical compensating plate 21 and the second optical compensating plate 22 are arranged at least between the incident side polarization plate 14 and the emission side polarization plate 16.

Furthermore, the above description has been given of an example in which the first optical compensating plate 21 is arranged closer to the incident side polarization plate 14 than the second optical compensating plate 22, but the second optical compensating plate 22 can be arranged closer to the incident side polarization plate 14 than the first optical compensating plate 21.

2. Second Embodiment

2-1. Phase Compensation According to Second Embodiment

An optical compensation unit 20A according to the second embodiment will be described with reference to FIG. 11.

The optical compensation unit 20A according to the second embodiment uses an integrated optical compensating plate having functions as the first optical compensating plate 21 and the second optical compensating plate 22 (hereinafter, described as an "integrated optical compensating plate 23").

Note that, in the following description, parts similar to already-described parts are assigned the same reference numerals, and the description will be omitted.

As illustrated in FIG. 11B, the integrated optical compensating plate 23 has a configuration in which a phase difference layer of the first optical compensating plate 21 (that is, medium equivalent to negative C-plate: described as a "first phase difference layer 23b"), and a phase difference layer of the second optical compensating plate 23 (that is, a phase difference layer having refractive index aeolotropy in the in-plane direction: described as a "second phase difference layer 23c") are respectively formed on the front surface side and the back surface side of a substrate 23a being a transparent substrate such as a glass substrate, for example. In this example, the first phase difference layer 23b and the second phase difference layer 23c include inorganic material, and the formation of these phase difference layers on the substrate 23a is performed by coating such as deposition or sputtering, for example.

The integrated optical compensating plate 23 is arranged between the liquid crystal panel 15 and the emission side polarization plate 16 in such a manner that a surface on which the first phase difference layer 23b is formed faces the liquid crystal panel 15, and a surface on which the second phase difference layer 23c is formed faces the emission side polarization plate 16 (refer to FIGS. 11A and 11B).

Then, for obtaining a phase compensation effect caused by the first phase difference layer 23b, similarly to the first optical compensating plate 21, the integrated optical compensating plate 23 is tilted at a predetermined angle (tilt angle θ') in the tilt direction Dt from a state parallel to the liquid crystal panel 15.

At this time, the second phase difference layer 23c is tilted integrally with the first phase difference layer 23b, but it has been confirmed from a result of experiment that substantially similar phase compensation effects are obtained in a case where the second phase difference layer 23c (the second optical compensating plate 22) is tilted and in a case where the second phase difference layer 23c (the second optical compensating plate 22) is not tilted.

Meanwhile, the integrated optical compensating plate 23 being tilted in the tilt direction Dt means that the direction of the optical axis Aa of the second phase difference layer 23c also changes. Specifically, it is assumed that the rubbing direction Dr is a 45-degree direction, and the optical axis Aa of the second phase difference layer 23c is parallel to the light absorption axis of the emission side polarization plate 16 in a state in which the integrated optical compensating plate 23 is arranged parallel to the liquid crystal panel 15, that is to say, the optical axis Aa extends in a 90-degree direction (the y-axis direction). At this time, if the integrated optical compensating plate 23 is tilted in the tilt direction Dt, the optical axis Aa extends in a direction of less than 90 degrees, that is to say, a direction closer to the x-axis.

In view of the foregoing, the integrated optical compensating plate 23 is arranged with being rotated in a tilted plane from the state of being tilted in the tilt direction Dt (that is, the integrated optical compensating plate 23 is rotated about an axis tilted at the tilt angle θ' from the z-axis in the drawing) in such a manner that the optical axis Aa of the second phase difference layer 23c substantially corresponds to the y-axis, that is, becomes substantially parallel to the light absorption axis of the emission side polarization plate 16.

Alternatively, the rotation for making the optical axis Aa substantially parallel to the light absorption axis of the emission side polarization plate 16 can also be performed about the z-axis without performing in the tilted plane as described above.

Note that, in a case where the rotation is performed about the z-axis, because a tilting direction of liquid crystal molecules caused by pre-tilt and a tilting direction of a refractive index ellipsoid in the first phase difference layer 23b do not correspond to each other, for obtaining a higher phase compensation effect, it is desirable to rotate the integrated optical compensating plate 23 in the tilted plane. Nevertheless, it is confirmed that, in actual use, a large difference is not generated in contrast performance if any of the above-described rotations is performed.

Here, as for a rotation angle of the integrated optical compensating plate 23, actually, a rotation adjustment mechanism of the integrated optical compensating plate 23 is provided, and an angle at which contrast becomes the highest is obtained while changing the rotation angle of the integrated optical compensating plate 23 by the adjustment mechanism.

At this time, in a case where the rotation of the integrated optical compensating plate 23 is adjusted in a plane tilted at the tilt angle θ' as described above, the rotation adjustment mechanism is configured to be able to adjust a rotation angle of the integrated optical compensating plate 23 about an axis parallel to the thickness direction of the integrated optical compensating plate 23. Alternatively, in a case where rotation adjustment of the integrated optical compensating plate 23 is performed about the Z-axis, the rotation adjustment mechanism is configured to be able to adjust a rotation angle of the integrated optical compensating plate 23 about an axis parallel to the thickness direction of the liquid crystal panel 15.

Note that, actually, it is sometimes difficult for the rotation adjustment mechanism to adjust a rotational axis to completely correspond to a desired axis. Accordingly, the rotation adjustment mechanism is not limited to a rotation adjustment mechanism that adjusts a rotational axis to completely correspond to a desired axis, and is only required to adjust a rotational axis to substantially correspond to a desired axis.

As for rotation adjustment of the integrated optical compensating plate 23, when a reference angle is set to an angle at which the optical axis Aa extends in a direction parallel to the light absorption axis of the emission side polarization plate 16, a rotation angle at which contrast becomes highest does not always correspond to the reference angle. This is considered to be attributed to a variation in an optical system such as a variation in pre-tilt in the liquid crystal panel 15.

As seen from this point, a direction in which the optical axis Aa extends needs not strictly be a direction parallel to the light absorption axis of the emission side polarization plate 16, and is only required to be a direction approximately parallel (direction substantially parallel) to the light absorption axis of the emission side polarization plate 16.

Note that the above description has been given of a rotation adjustment mechanism in a case where a first optical compensation unit and a second optical compensation unit are formed as an integrated optical compensating plate, but in a case where a second optical compensation unit is provided as an optical compensating plate separated from a first optical compensation unit as in the first embodiment, an optical compensating plate serving as the second optical compensation unit may also be provided with a similar rotation adjustment mechanism.

2-2. Experiment Result

A result obtained by performing experiment on the phase compensation unit 20A that uses the integrated optical compensating plate 23 will be described with reference to FIGS. 12 and 13.

FIG. 12 is a diagram illustrating a change characteristic of a contrast rate with respect to the tilt angle θ' of the integrated optical compensating plate 23, and FIG. 12A illustrates an experiment result of "Low Panel", FIG. 12B illustrates an experiment result of "Typical Panel", and FIG. 12C illustrates an experiment result of "High Panel".

Here, a contrast rate indicated by a vertical axis in each diagram is a value indicating an increase rate of contrast in a state in which a target optical compensating plate is used, when a contrast in a state in which the optical compensating plate is unused is set to "1". For example, when a contrast in an unused state is 1:1000, if a contrast in a used state is 1:1500, a contrast rate is represented as contrast rate=1.5 times. Furthermore, a horizontal axis in each diagram indicates a tilt angle θ' of an optical compensating plate.

"Low", "Typical", and "High" of "Low Panel", "Typical Panel", and "High Panel" respectively indicate pre-tilt states of the liquid crystal of the liquid crystal panel 15, and "Low Panel" means the liquid crystal panel 15 at a large pre-tilt angle θ, "High Panel" means the liquid crystal panel 15 at a small pre-tilt angle θ, and "Typical Panel" means the liquid crystal panel 15 at a pre-tilt angle θ set to about an intermediate level between "Low Panel" and "High Panel".

In each diagram in FIGS. 12A to 12C, on the upper side, an experiment result in a case where only the first optical compensating plate 21 is inserted is illustrated as reference. On the lower side, experiment performed in a case where the integrated optical compensating plate 23 is used (that is, corresponding to a case where both of the first optical compensating plate 21 and the second optical compensating plate 22 are inserted) is illustrated.

Note that an experiment result on the lower side of each diagram illustrates a result of a case where the integrated optical compensating plate 23 is adjusted by the above-described rotation adjustment mechanism in such a manner that contrast becomes highest.

Referring to the upper sides in FIGS. 12A to 12C, maximum values of contrast rates in a case where only the first optical compensating plate 21 is used are about 2.5 in "Low Panel", about 1.8 in "Typical Panel", and about 1.7 in "High Panel". When the upper side and the lower side in each diagram are compared, it can be seen that, in a case where the integrated optical compensating plate 23 is used, a tilt angle θ' can be made smaller for obtaining an equivalent contrast rate, as compared with a case where only the first optical compensating plate 21 is used. For example, while a tilt angle θ' for obtaining the maximum contrast rate by using only the first optical compensating plate 21 is about 5 degrees in "Typical Panel", a tilt angle θ' for obtaining an equivalent contrast rate in a case where the integrated optical compensating plate 23 is used is about 3 degrees.

In this manner, by using the second phase difference layer 23b (the second optical compensating plate 22), it is possible to reduce a tilt angle θ' required for achieving predetermined contrast performance.

FIG. 13 illustrates an experiment result of a direction of the optical axis Aa in the integrated optical compensating plate 23, and FIG. 13A illustrates a change characteristic of a contrast rate with respect to the tilt angle θ' in a case where the optical axis Aa extends in a direction substantially parallel to the light absorption axis of the emission side polarization plate 16, and FIG. 13B illustrates the change characteristic in a case where the optical axis Aa extends in a direction substantially parallel to the light transmission axis At2 of the emission side polarization plate 16.

Note that a result in FIG. 13A illustrates a result in a case where the rotation of the integrated optical compensating plate 23 is adjusted in such a manner that the highest contrast can be obtained within an angle range near the above-described reference angle, as angle adjustment of the integrated optical compensating plate 23 that uses the rotation adjustment mechanism. On the other hand, a result in FIG. 13B illustrates a result in a case where the rotation of the integrated optical compensating plate 23 is adjusted in such a manner that the highest contrast can be obtained within an angle range near an angle shifted by 90 degrees from the reference angle, as angle adjustment of the integrated optical compensating plate 23 that uses the rotation adjustment mechanism.

When FIGS. 13A and 13B are compared, it can be confirmed that a characteristic of a contrast rate with respect to the tilt angle θ' is better in FIG. 13A. Specifically, in this example, within a range of tilt angle θ'=0 to 5 degrees, a result in which a contrast rate is higher by about 0.25 is obtained as compared with a case of FIG. 13B.

From the result in FIG. 13, it can be seen that favorable contrast performance is obtained by extending the optical axis Aa in a direction substantially parallel to the light absorption axis of the emission side polarization plate 16.

Note that, in the experiment result in FIG. 13, a change characteristic of a contrast rate with respect to the tilt angle θ' is different as compared with the case in FIG. 12 because a characteristic (for example, inch size, etc.) of the used liquid crystal panel 15 is different from that in the case of FIG. 12.

FIG. 14 illustrates, as reference, a change characteristic of a contrast rate with respect to the tilt angle θ' of the first optical compensating plate 21 in a case where the second phase difference layer 23c is not tilted in the tilt direction Dt, specifically, in a case where the tilt angle θ' of the second optical compensating plate 22 is set to 0 degree in a configuration in which the first optical compensating plate 21 and the second optical compensating plate 22 are separately formed as in the first embodiment (that is, a state in which the second optical compensating plate 22 is arranged parallel to the liquid crystal panel 15).

Here, in the experiment in FIG. 14, the second optical compensating plate 22 was formed integrally with the emission side polarization plate 16. For this reason, rotation adjustment of the optical axis Aa of the second optical compensating plate 22 is not performed using the above-described rotation adjustment mechanism. In other words, the second optical compensating plate 22 in this experiment is arranged in such a manner that the optical axis Aa extends in a direction substantially parallel to the light absorption axis of the emission side polarization plate 16, but rotation adjustment for making contrast highest is not performed because a rotation adjustment mechanism is not provided.

When being compared with FIG. 13A described above, especially in a case where the tilt angle θ' is 3 or 4 degrees, a higher contrast rate is obtained in FIG. 14. From this result, it can be seen that, in a case where the second optical compensating plate 22 is separately formed as in the first embodiment, a higher phase compensation effect is obtained as compared with a case where the second optical compensating plate 22 is integrally formed, even if fine adjustment (rotation adjustment) of the optical axis Aa is not performed.

Nevertheless, as described with reference to FIG. 12 described above, even in a case where the second optical compensating plate 22 is integrally formed, the tilt angle θ' for achieving predetermined contrast can be made smaller as well. Moreover, if the second optical compensating plate 22 is integrally formed, downsizing of an optical system can be achieved as compared with a case where the second optical compensating plate 22 is separately formed.

3. Third Embodiment

Figure 15:
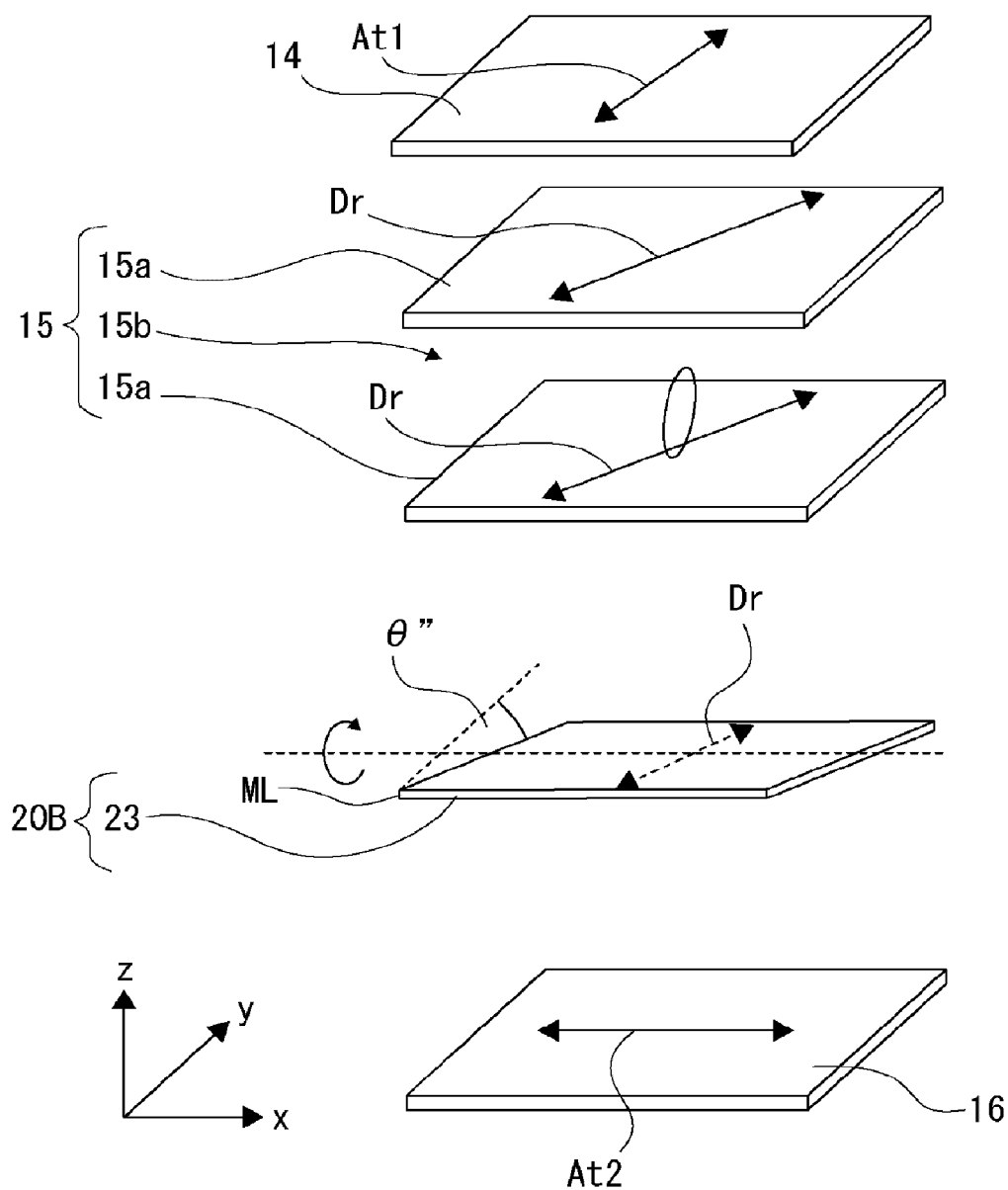
FIG. 15 is a diagram for describing a configuration example of an optical compensation unit according to a third embodiment.

Subsequently, an optical compensation unit 20B according to the third embodiment will be described with reference to FIG. 15.

The optical compensation unit 20B uses the integrated optical compensating plate 23 similarly to the second embodiment, but a direction in which the integrated optical compensating plate 23 is tilted is different.

Specifically, in the optical compensation unit 20B, the integrated optical compensating plate 23 is tilted in a rotation direction around the X-axis in the drawing, from a state parallel to the liquid crystal panel 15. In this example, the integrated optical compensating plate 23 has a landscape substantially rectangular shape, and is tilted in a rotation direction around an axis parallel to a long side in a plane, from a parallel state in which long side directions and short side directions correspond to each other with the liquid crystal panel 15. A tilt angle of the integrated optical compensating plate 23 in this case (that is, a tilt angle from a state parallel to the liquid crystal panel 15) is described as a "tilt angle θ''".

Figure 16:
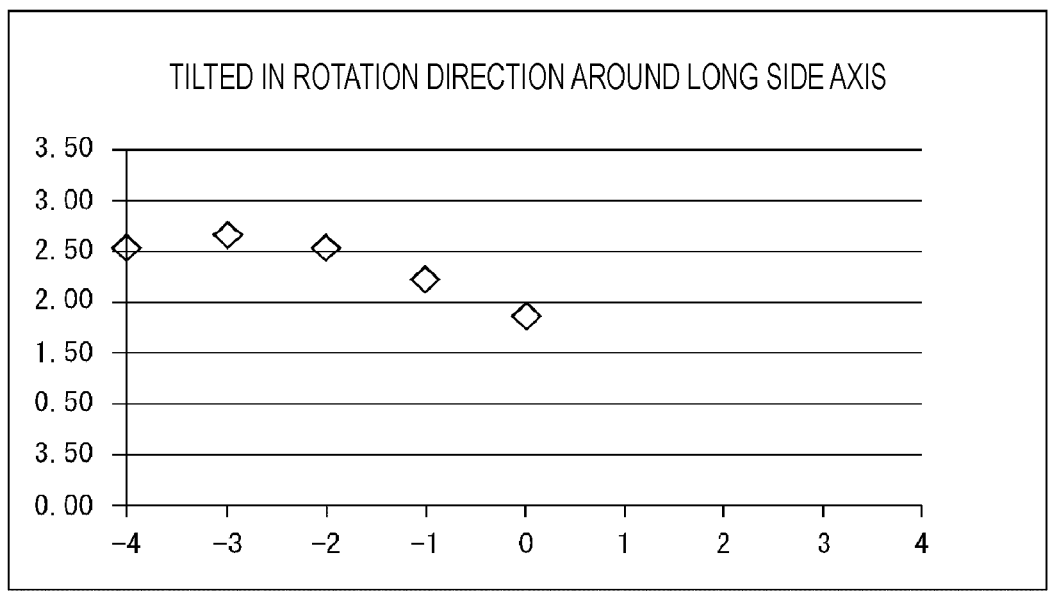
FIG. 16 is a diagram illustrating a result of experiment of a phase compensation effect obtained by an optical compensation unit according to the third embodiment.

FIG. 16 is a diagram illustrating an experiment result of the optical compensation unit 20B, and illustrates a change characteristic of a contrast rate with respect to the tilt angle θ'' of the integrated optical compensating plate 23. Note that, in the experiment in FIG. 16, the same liquid crystal panel 15 as that used in FIG. 13 described above is used. Furthermore, rotation adjustment of the optical axis Aa for making contrast highest is also performed.

As illustrated in the drawing, within a range in which the tilt angle θ'' is −2 to −4 degrees, a result in which a contrast rate keeps 2.5 or more was obtained. Especially in a case where the tilt angle θ'' is the tilt angle θ''=−3 degrees, a contrast rate becomes 2.6 or more.

In this manner, also in a case where the integrated optical compensating plate 23 is rotated (tilted) in a direction around an axis parallel to the long side, a contrast characteristic substantially equivalent to that in a case where the integrated optical compensating plate 23 is tilted in the tilt direction Dt (refer to FIG. 13A) can be obtained. In other words, a substantially equivalent phase compensation effect can be obtained.

Note that the optical compensation unit 20B can have a configuration in which the first optical compensating plate 21 and the second optical compensating plate 22 are separately provided. In this case, the first optical compensating plate 21 is arranged with being tilted similarly to the integrated optical compensating plate 23 illustrated in FIG. 15. For enhancing a phase compensation effect, it is desirable that the second optical compensating plate 22 is arranged parallel to the liquid crystal panel 15.

4. Fourth Embodiment

A liquid crystal display apparatus 1A according to the fourth embodiment will be described with reference to FIGS. 17 to 19.

Figure 17:
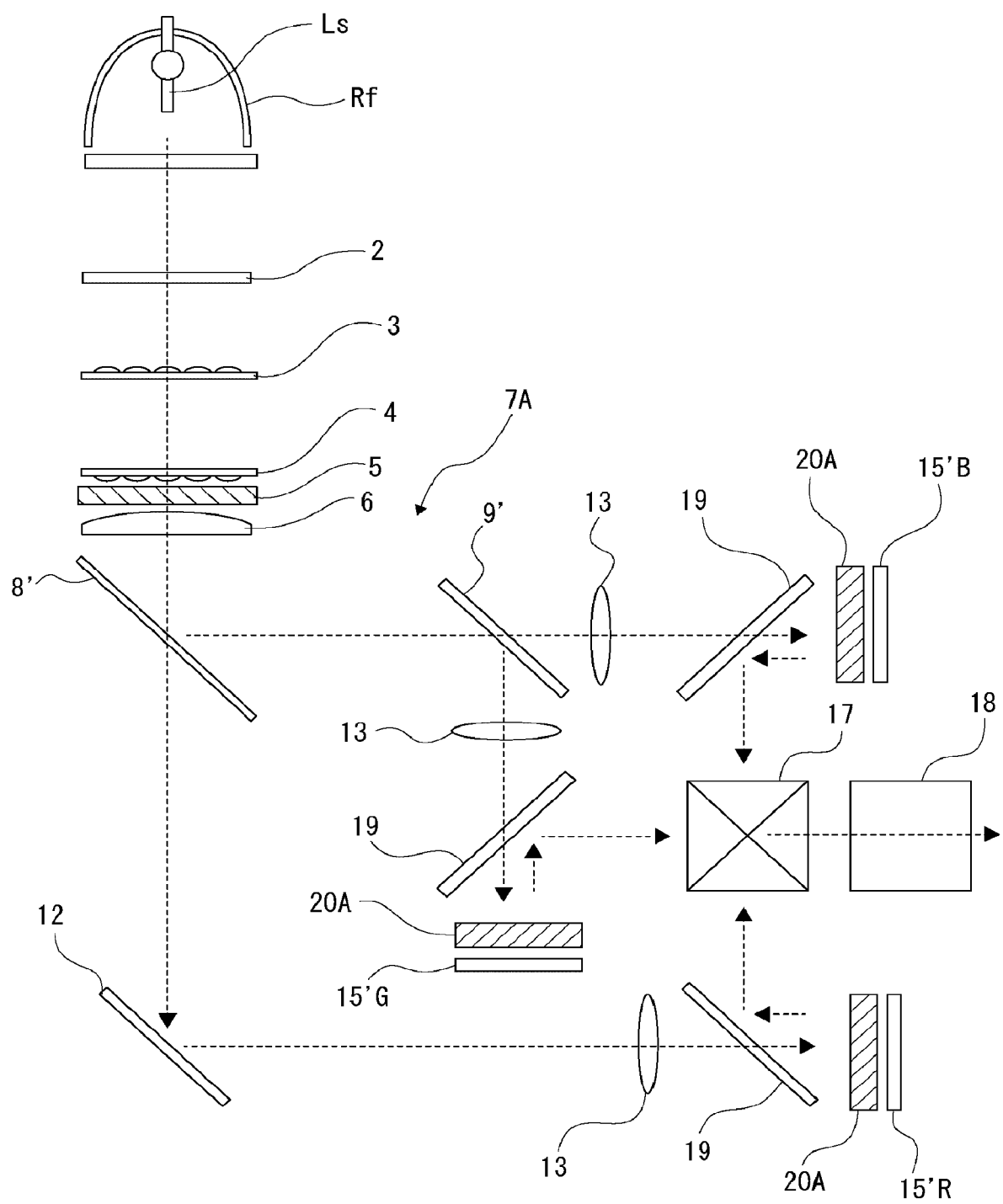
FIG. 17 is a diagram illustrating a configuration example of a liquid crystal display apparatus according to a fourth embodiment.

FIG. 17 is a diagram illustrating a configuration example of the liquid crystal display apparatus 1A.

In the liquid crystal display apparatus 1A, the optical compensation unit 20A is applied to a case where a configuration of a reflective liquid crystal that reflects light having passed through the liquid crystal layer 15b, using a mirror, and lets the light through the liquid crystal layer 15b again is employed.

The liquid crystal display apparatus 1A is different from the liquid crystal display apparatus 1 illustrated in FIG. 1 in that a separation synthesis optical system 7A is provided in place of the separation synthesis optical system 7. In the separation synthesis optical system 7A, a dichroic mirror 8' and a dichroic mirror 9' are provided in place of the dichroic mirror 8 and the dichroic mirror 9. Furthermore, in the separation synthesis optical system 7A, three liquid crystal panels 15'R, 15'G, and 15'B respectively corresponding to R light, G light, and B light are provided as reflective liquid crystal panels 15'. Moreover, in the separation synthesis optical system 7A, a reflective polarization plate 19 (wire grid) is provided as a polarization plate provided for each of these liquid crystal panels 15'R, 15'G, and 15'B.

As for incident light from the condenser lens 6, the dichroic mirror 8' lets through R light and reflects G light and B light. G light and B light that have been reflected by the dichroic mirror 8' enter the dichroic mirror 9', and the dichroic mirror 9' lets through the B light and reflects the G light. Therefore, emitted light of the condenser lens 6 is color-separated into R light, G light, and B light.

R light having passed through the dichroic mirror 8' is reflected by the mirror 12, and enters the reflective polarization plate 19 for R light after having passed through the condenser lens 13 for R light. G light reflected by the dichroic mirror 9' enters the reflective polarization plate 19 for G light after having passed through the condenser lens 13 for G light. Furthermore, B light having passed through the dichroic mirror 9' enters the reflective polarization plate 19 for B light after having passed through the condenser lens 13 for B light.

In this example, emitted light from the condenser lens 6 becomes p-polarized light by the function of the polarization conversion element 5. The respective reflective polarization plates 19 for R light, G light, and B light are configured to let through p-polarized light and reflect s-polarized light. Accordingly, for each of R light, B light, and G light, light entering the reflective polarization plate 19 from the condenser lens 13 passes through the reflective polarization plate 19.

For each of R light, B light, and G light, light having passed through the reflective polarization plate 19 in this manner enters the liquid crystal panel 15'R, 15'G, or 15'B via a corresponding one of the optical compensation units 20A (the integrated optical compensating plates 23) for R light, B light, and G light.

In each of the liquid crystal panels 15', a mirror that reflects light having passed through the liquid crystal layer 15b (the illustration is omitted in this drawing), to an opposite side of an incidence surface of light is formed, and light having passed through the reflective polarization plate 19 and entering the liquid crystal panel 15' is reflected by the mirror after having passed through the liquid crystal layer 15b, and then, passes through the liquid crystal layer 15b again and enters the reflective polarization plate 19.

For each of R light, B light, and G light, a part of light entering the reflective polarization plate 19 from the liquid crystal panel 15' side, that is to say, a component of s-polarized light is reflected by the reflective polarization plate 19 and enters the color synthesis prism 17 as illustrated in the drawing. The color synthesis prism 17 emits each of the entered R light, G light, and B light toward the projector lens 18.

Figure 18:
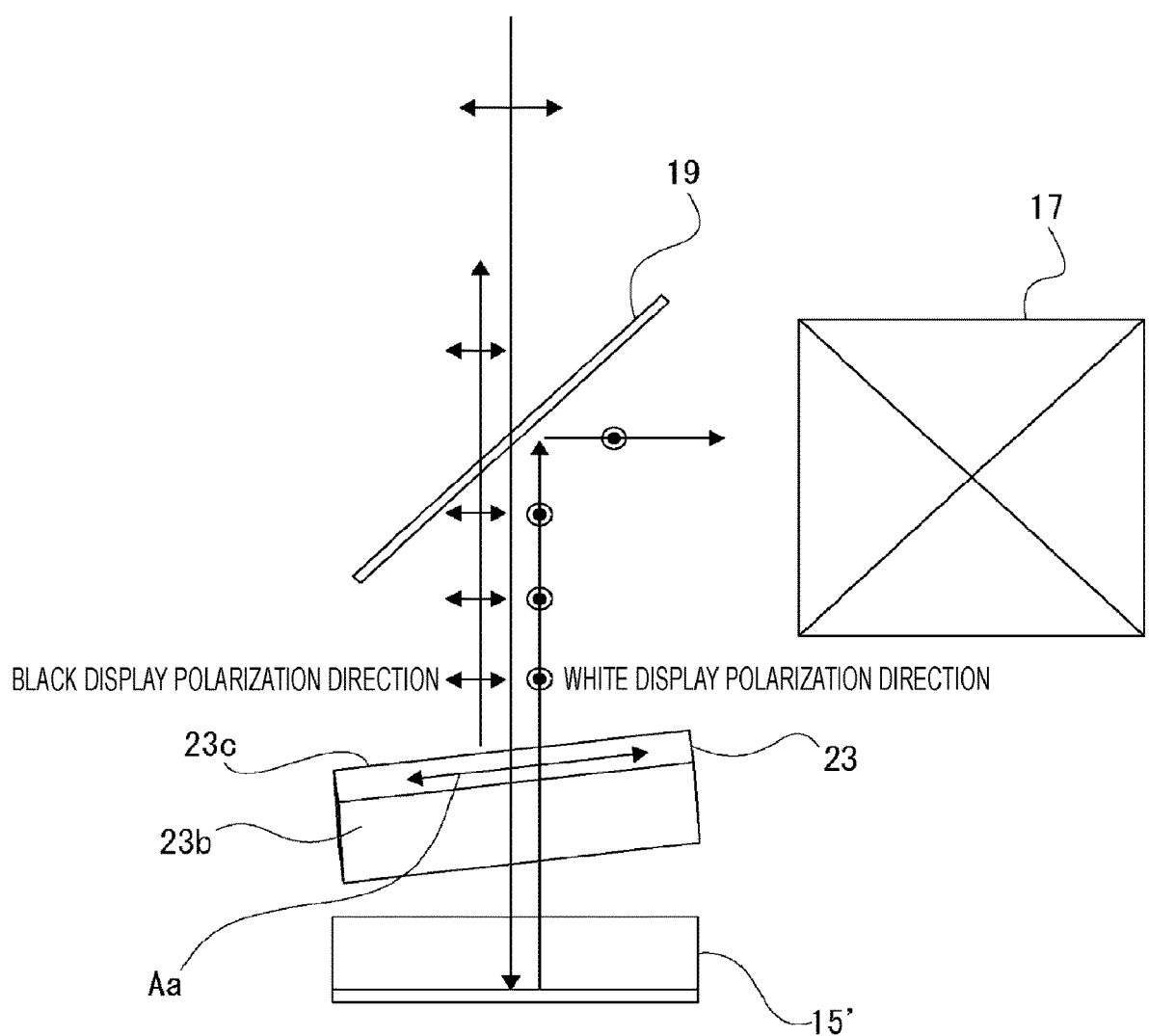
FIG. 18 is a diagram for describing a configuration example of a main part of the liquid crystal display apparatus according to the fourth embodiment.

FIG. 18 is a diagram illustrating a configuration example of a main part of the liquid crystal display apparatus 1A. Specifically, FIG. 18 schematically illustrates the arrangement relationship between the reflective polarization plate 19, the integrated optical compensating plate 23, the liquid crystal panel 15', and the color synthesis prism 17 on an optical path of each of R light, G light, and B light.

In this case, the integrated optical compensating plate 23 is arranged in such a manner that the first phase difference layer 23b is positioned to face the liquid crystal panel 15', and the second phase difference layer 23c is positioned to face the reflective polarization plate 19.

Furthermore, the integrated optical compensating plate 23 is tilted in the same direction as the tilt direction Dt (tilt direction Dt of the liquid crystal panel 15') from a state parallel to the liquid crystal panel 15'.

In this case, the integrated optical compensating plate 23 is arranged in such a manner that the direction of the optical axis Aa becomes substantially parallel to a polarization direction of incident light from the reflective polarization plate 19. That is, as illustrated in the drawing, when a sheet surface traverse direction is regarded as a polarization direction of incident light from the reflective polarization plate 19, the optical axis Aa extends in the direction substantially parallel to the traverse direction (when viewed from the incidence surface front viewpoint).

Note that, in this case, a direction in which the optical axis Aa extends becomes a direction substantially parallel to a light transmission axis of the reflective polarization plate 19, but this can also be said to be a direction substantially orthogonal to a light reflection axis of the reflective polarization plate 19.

Figure 19:
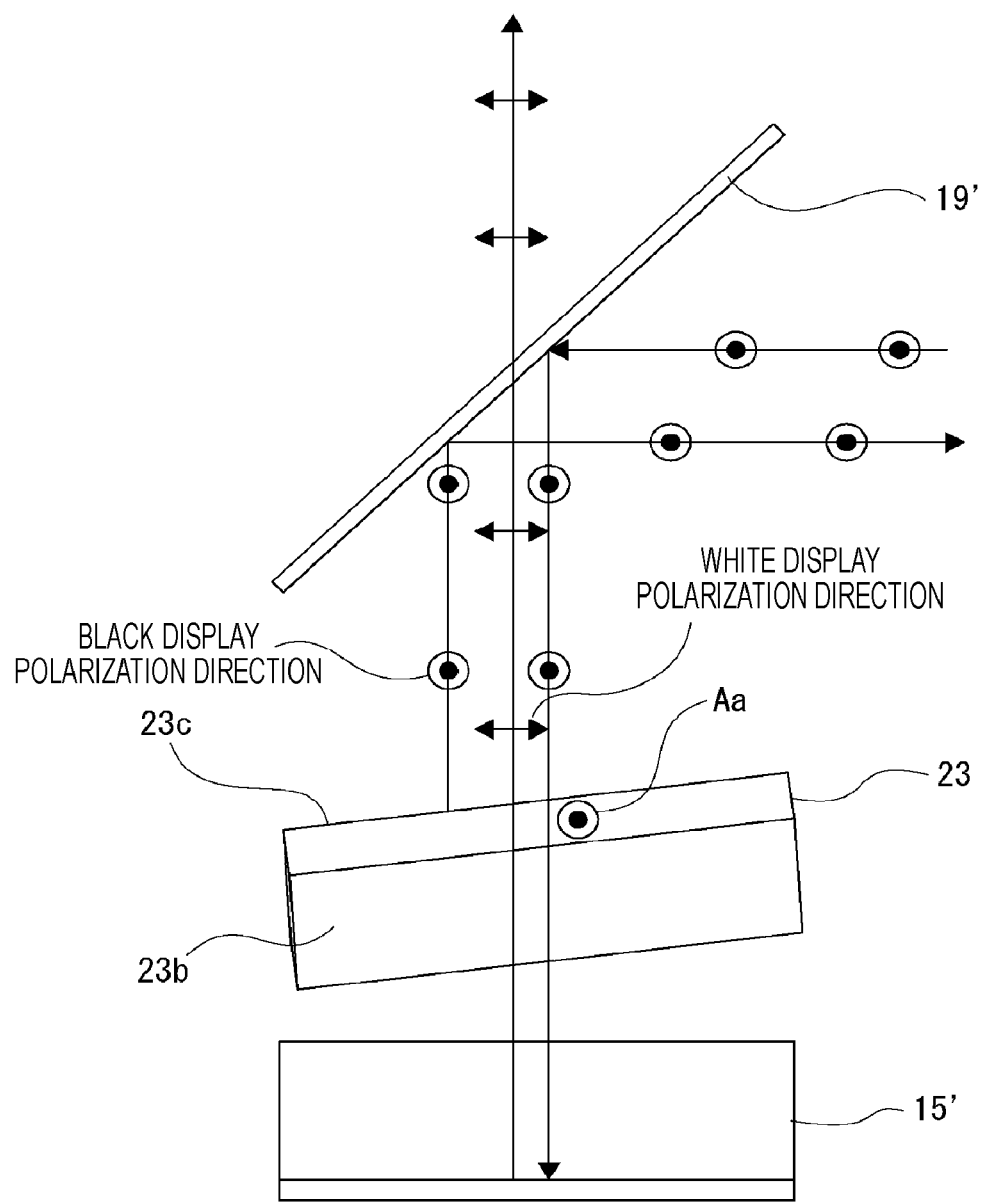
FIG. 19 is an explanatory diagram illustrating a modified example of the fourth embodiment.

Here, as exemplified in FIG. 19, a reflective polarization plate 19' that reflects s-polarized light and lets through p-polarized light can also be used in place of the reflective polarization plate 19. In this case, incident light from the condenser lens 6 becomes s-polarized light, and the reflective polarization plate 19' reflects incident light being the s-polarized light and emits the incident light to the integrated optical compensating plate 23.

In this case, a component of p-polarized light included in emitted light from the liquid crystal panel 15' passes through the reflective polarization plate 19' and enters the color synthesis prism 17 (not illustrated).

Even in a case where the configuration illustrated in FIG. 19 is employed, for enhancing a phase compensation effect of the second phase difference layer 23c, the integrated optical compensating plate 23 is arranged in such a manner that the direction of the optical axis Aa becomes a direction substantially parallel to a polarization direction of incident light from the reflective polarization plate 19'.

Specifically, in a case where the configuration illustrated in FIG. 19 is employed, the direction substantially parallel to the polarization direction of incident light from the reflective polarization plate 19' becomes a direction substantially parallel to a light reflection axis of the reflective polarization plate 19' (direction substantially orthogonal to a light transmission axis).

Here, the integrated optical compensating plate 23 illustrated in FIG. 18 or 19 is arranged between the reflective polarization plate 19 (19') and the liquid crystal panel 15' in such a manner that the first phase difference layer 23b is positioned to face the liquid crystal panel 15' and the second phase difference layer 23c is positioned to face the reflective polarization plate 19.

By such arrangement of the integrated optical compensating plate 23, light having passed through the liquid crystal layer 15b (light being reflected by the mirror and having passed through the liquid crystal layer 15b) passes through the first phase difference layer 23b and the second phase difference layer 23c in this order.

That is, light having been subjected to phase compensation performed by the first phase difference layer 23b passes through the second phase difference layer 23c. Therefore, a phase compensation effect can be enhanced as compared with the case of causing light having passed through the liquid crystal layer 15b, to enter the second phase difference layer 23c without performing compensation.

Note that, also in the reflective the liquid crystal display apparatus 1A, the separated-type optical compensation unit 20 described in the first embodiment can be applied instead of the optical compensation unit 20A that uses the integrated optical compensating plate 23. Furthermore, the optical compensation unit 20B described in the third embodiment can also be applied.

5. Conclusion of Embodiments

As described above, the liquid crystal display apparatus (1 or 1A) according to an embodiment includes a vertical alignment liquid crystal panel (15 or 15'), a first optical compensation unit (first optical compensating plate 21 or first phase difference layer 23b) including a medium having a small refractive index in the thickness direction, and being arranged with being tilted from a state parallel to the liquid crystal panel, at a position at which light having passed through the liquid crystal panel or not having passed through the liquid crystal panel enters, and a second optical compensation unit (second optical compensating plate 22 or second phase difference layer 23c) having refractive index aeolotropy at least in an in-plane direction, and being arranged at a position at which light having passed through the liquid crystal panel or not having passed through the liquid crystal panel enters.

In the above-described second optical compensation unit, because an in-plane phase difference is generated, a phase shift in the in-plane direction that is generated by the tilt of the first optical compensation unit (medium having a small refractive index in the thickness direction) being incomplete can be compensated for by the in-plane phase difference of the second optical compensation unit.

Accordingly, an optical system can be downsized by reducing a tilt angle of an optical compensating plate including a medium having a small refractive index in the thickness direction, in achieving a predetermined contrast.

Furthermore, in the liquid crystal display apparatus according to an embodiment, a polarization element (incident side polarization plate 14, reflective polarization plate 19 or 19') arranged between a light source and a liquid crystal panel on an optical path from the light source (Ls) is included, and when a polarization direction of incident light from the polarization element toward the liquid crystal panel side is regarded as an incident polarization direction, the second optical compensation unit is arranged in such a manner that a slow axis (optical axis Aa) extends in a direction substantially parallel to the incident polarization direction.

Therefore, a phase shift in the in-plane direction that is generated by the tilt of the first optical compensation unit being incomplete is favorably compensated for by the in-plane phase difference of the second optical compensation unit.

Accordingly, a phase shift attributed to pre-tilt of the liquid crystal is compensated for, and contrast can be improved.

Moreover, in the liquid crystal display apparatus according to an embodiment, the first optical compensation unit is arranged with being tilted in the same direction as the tilt direction (Dt) of the liquid crystal of the liquid crystal panel from a state parallel to the liquid crystal panel.

Therefore, a phase compensation effect caused by the first optical compensating plate is enhanced.

Moreover, in the liquid crystal display apparatus according to an embodiment, a tilt angle of the first optical compensation unit from a parallel state is set to an angle equal to or less than a pre-tilt angle of the liquid crystal panel.

Therefore, an optical system can be prevented from unnecessarily upsizing due to the tilt of the first optical compensation unit. In other words, downsizing of the optical system is achieved.

Moreover, furthermore, in the liquid crystal display apparatus according to an embodiment, the first and second optical compensation units are arranged in such a manner that light having passed through the liquid crystal panel passes through the first optical compensation unit and the second optical compensation unit in this order.

Therefore, light having been subjected to phase compensation performed by the first optical compensating unit passes through the second optical compensating unit. It has been confirmed by experiment that a phase compensation effect is enhanced by causing light having passed through the liquid crystal, to enter the second optical compensating unit after compensation is performed by first optical compensating unit, rather than causing the light to enter the second optical compensating unit without performing compensation.

Accordingly, a contrast improving effect can be enhanced by the above-described arrangement of the first and second optical compensating units.

Furthermore, in the liquid crystal display apparatus according to an embodiment, the second optical compensation unit includes inorganic material.

Therefore, light resistance and heat resistance of the second optical compensation unit can be improved.

Accordingly, contrast can be prevented from declining due to a deterioration in phase compensation performance and transubstantiation of the second optical compensation unit that is caused in accordance with the use of the liquid crystal display apparatus.

Moreover, in the liquid crystal display apparatus according to an embodiment, when axes orthogonal to each other in the in-plane direction are defined as the X-axis and the Y-axis, and an axis parallel to the thickness direction is defined as the Z-axis, in the second optical compensation unit, a refractive index in the x-axis direction becomes the largest, and refractive indices in the y-axis direction and the z-axis direction are different.

According to the above-described configuration, as the second optical compensation unit including inorganic material, the need for equalizing refractive indices in the y-axis direction and the z-axis direction is eliminated.

Therefore, a creation difficulty level of the second optical compensation unit is reduced, and cost can be saved.

Moreover, furthermore, in the liquid crystal display apparatus according to an embodiment, the first optical compensation unit and the second optical compensation unit are formed as separate optical compensating plates.

Therefore, the second optical compensation unit can avoid being arranged with being tilted together with the first optical compensation unit.

Because the second optical compensation unit can avoid being excessively tilted with respect to a light axis, a phase compensation effect can be enhanced, and a contrast improving effect can be enhanced.

Furthermore, in the liquid crystal display apparatus according to an embodiment, the second optical compensation unit is arranged parallel to the liquid crystal panel.

Therefore, a phase compensation effect of the second optical compensation unit for a phase shift in the in-plane direction that is generated by the tilt of the first optical compensation unit being incomplete is enhanced.

Accordingly, a contrast improving effect can be enhanced.

Moreover, in the liquid crystal display apparatus according to an embodiment, the first optical compensation unit and the second optical compensation unit are formed as an integrated optical compensating plate (the integrated optical compensating plate 23).

Therefore, an arrangement interval of the first optical compensation unit and the second optical compensation unit can be narrowed, and downsizing of an optical system can be achieved.

Moreover, furthermore, in the liquid crystal display apparatus according to an embodiment, the liquid crystal panel is a reflective liquid crystal panel (15'), a polarization element (reflective polarization plate 19 or 19') arranged between a light source and the liquid crystal panel on an optical path from the light source is included, and first and second optical compensation units are arranged between the polarization element and the liquid crystal panel.

Therefore, in a case where a configuration of a reflective liquid crystal that reflects light having passed through a liquid crystal layer, using a mirror, and lets the light through the liquid crystal layer again is employed, the first and second optical compensation units can avoid being arranged between the liquid crystal layer and the mirror. In other words, there is no need to provide a mirror separately from the liquid crystal panel, and arrange first and second optical compensation units therebetween.

Accordingly, downsizing of an optical system can be achieved.

Furthermore, in the liquid crystal display apparatus according to an embodiment, a rotation adjustment mechanism that adjusts a rotation angle of the second optical compensation unit about an axis substantially parallel to either the thickness direction of the second optical compensation unit or the thickness direction of the liquid crystal panel is included.

By providing such a rotation adjustment mechanism, rotation angle adjustment of the second optical compensation unit for improving contrast can be easily performed.

Moreover, in the liquid crystal display apparatus according to an embodiment, a medium included in the first optical compensation unit has a multi-layer film structure including inorganic material.

Therefore, the first optical compensation unit can be created by alternately stacking high refractive index material and low refractive index material, and creation simplicity of the first optical compensation unit can be enhanced.

Furthermore, a display method according to an embodiment performs image display by projecting light from a light source via a vertical alignment liquid crystal panel, a first optical compensation unit including a medium having a small refractive index in the thickness direction, and being arranged with being tilted from a state parallel to the liquid crystal panel, at a position at which light having passed through the liquid crystal panel or not having passed through the liquid crystal panel enters, and a second optical compensation unit having refractive index aeolotropy at least in an in-plane direction, and being arranged at a position at which light having passed through the liquid crystal panel or not having passed through the liquid crystal panel enters.

Also according to such a display method according to an embodiment, functions and effects that are similar to those of the above-described liquid crystal display apparatus according to an embodiment can be obtained.

Note that effects described in this specification are mere exemplifications and are not limited, and other effects may be caused.

6. Modified Example

The present technology is not limited to the above-described specific examples, and various modified examples can be considered.

For example, the configuration of the optical system of the liquid crystal display apparatus has been described merely as an example, and for example, various optical elements that are not illustrated in the drawings are arranged in some cases (for example, a microlens is arranged on the incidence surface side of the liquid crystal panel 15, or the like).

Furthermore, as already described, in the configuration that uses the transmissive liquid crystal panel 15, the second optical compensating plate 22 can be formed integrally with the emission side polarization plate 16. Therefore, downsizing of an optical system can be achieved.

Furthermore, the above description has been given of an example in which the present technology is applied for downsizing an optical system, but in a case where an error is generated in the tilt of the first optical compensation unit from an optimum tilt, the present technology can be widely applied to compensation for a phase shift generated due to the error (phase shift in the in-plane direction), irrespective of whether or not a tilt angle of the first optical compensation unit including a medium having a small refractive index in the thickness direction is restricted.

For example, in a case where the tilt angle θ' of the first optical compensation unit is smaller (than an optimum angle), rotation adjustment is performed in such a manner that the direction of the optical axis Aa of the second optical compensation unit becomes a direction opposite to the tilt direction Dt (opposite direction when viewed from the above-described incidence surface front viewpoint). In contrast, in a case where the tilt angle θ' is larger, rotation adjustment is performed in such a manner that the direction of the optical axis Aa becomes the same direction as the tilt direction Dt (similarly, the same direction when viewed from the incidence surface front viewpoint). Contrast can be thereby improved.

Consequently, a variation of a pre-tilt angle θ that is generated due to a manufacturing variation of a liquid crystal panel can also be effectively compensated for by using the second optical compensation unit.

7. Present Technology

Note that the present technology can also employ the following configurations.

(1) A liquid crystal display apparatus including:
a vertical alignment liquid crystal panel;
a first optical compensation unit including a medium having a small refractive index in a thickness direction, and being arranged with being tilted from a state parallel to the liquid crystal panel, at a position at which light having passed through the liquid crystal panel or not having passed through the liquid crystal panel enters; and a second optical compensation unit having refractive index aeolotropy at least in an in-plane direction, and being arranged at a position at which light having passed through the liquid crystal panel or not having passed through the liquid crystal panel enters.

(2) The liquid crystal display apparatus according to (1) described above,
in which a polarization element arranged between a light source and the liquid crystal panel on an optical path from the light source is included, and
when a polarization direction of incident light from the polarization element to a side of the liquid crystal panel is regarded as an incident polarization direction,
the second optical compensation unit is arranged in such a manner that a direction of a slow axis is substantially parallel to the incident polarization direction.

(3) The liquid crystal display apparatus according to (1) or (2) described above,
in which the first optical compensation unit is arranged with being tilted in a same direction as a tilt direction of a liquid crystal of the liquid crystal panel from a state parallel to the liquid crystal panel.

(4) The liquid crystal display apparatus according to (3) described above,
in which a tilt angle of the first optical compensation unit from the parallel state is set to an angle equal to or less than a pre-tilt angle of the liquid crystal panel.

(5) The liquid crystal display apparatus according to any of (1) to (4) described above,
in which the first and second optical compensation units are arranged in such a manner that light having passed through the liquid crystal panel passes through the first optical compensation unit and the second optical compensation unit in this order.

(6) The liquid crystal display apparatus according to any of (1) to (5) described above,
in which the second optical compensation unit includes inorganic material.

(7) The liquid crystal display apparatus according to (6) described above,
in which, when axes orthogonal to each other in an in-plane direction are defined as an x-axis and a y-axis, and an axis parallel to a thickness direction is defined as a z-axis, in the second optical compensation unit, a refractive index in an x-axis direction becomes largest, and refractive indices in a y-axis direction and a z-axis direction are different.

(8) The liquid crystal display apparatus according to any of (1) to (7) described above,
in which the first optical compensation unit and the second optical compensation unit are formed as separate optical compensating plates.

(9) The liquid crystal display apparatus according to any of (1) to (8) described above,
in which the second optical compensation unit is arranged parallel to the liquid crystal panel.

(10) The liquid crystal display apparatus according to any of (1) to (7) described above,
in which the first optical compensation unit and the second optical compensation unit are formed as an integrated optical compensating plate.

(11) The liquid crystal display apparatus according to any of (1) to (10) described above, in which the liquid crystal panel is a reflective liquid crystal panel,
a polarization element arranged between a light source and a liquid crystal panel on an optical path from a light source is included, and
the first and second optical compensation units are arranged between the polarization element and the liquid crystal panel.

(12) The liquid crystal display apparatus according to any of (1) to (11) described above,
in which a rotation adjustment mechanism configured to adjust a rotation angle of the second optical compensation unit about an axis substantially parallel to either a thickness direction of the second optical compensation unit or a thickness direction of the liquid crystal panel is included.

(13) The liquid crystal display apparatus according to any of (1) to (12) described above,
in which the medium included in the first optical compensation unit has a multi-layer film structure including inorganic material.

REFERENCE SIGNS LIST 1, 1A Liquid crystal display apparatus
Ls Light source
5 Polarization conversion element
7 Separation synthesis optical system
8 Dichroic mirror
9 Dichroic mirror
10 Filter
13 Condenser lens
14 Incident side polarization plate
(15R, 15G, 15B), 15' (15'R, 15'G, 15'B) liquid crystal panel
15a Substrate
15b Liquid crystal layer
16 Emission side polarization plate
17 Color synthesis prism
18 Projector lens (projection optical system)
19, 19' Reflective polarization plate
20, 20A, 20B Optical compensation unit
21 First optical compensating plate
22 Second optical compensating plate
23 Integrated optical compensating plate
23a Substrate
23b First phase difference layer
23c Second phase difference layer

The invention claimed is:

1. A liquid crystal display apparatus comprising:
a vertical alignment liquid crystal panel;
a first optical compensation plate including a medium having a smaller refractive index in a thickness direction than in an in-plane direction, and being arranged with being tilted from a state parallel to the liquid crystal panel, at a position at which light having passed through the liquid crystal panel or not having passed through the liquid crystal panel enters, the first optical compensation plate being formed of a film on a transparent substrate; and
a second optical compensation plate having refractive index aeolotropy at least in an in-plane direction, and being arranged at a position at which light having passed through the liquid crystal panel or not having passed through the liquid crystal panel enters,
wherein the first optical compensation plate is arranged with being tilted in a same direction as a tilt direction of a liquid crystal of the liquid crystal panel from a state parallel to the liquid crystal panel, and
wherein a tilt angle of the first optical compensation plate from the parallel state is set to an angle less than a pre-tilt angle of the liquid crystal panel.

2. The liquid crystal display apparatus according to claim 1,
wherein a polarization element arranged between a light source and the liquid crystal panel on an optical path from the light source is included, and
when a polarization direction of incident light from the polarization element to a side of the liquid crystal panel is regarded as an incident polarization direction,
the second optical compensation plate is arranged in such a manner that a direction of a slow axis is substantially parallel to the incident polarization direction.

3. The liquid crystal display apparatus according to claim 1,
wherein the first and second optical compensation plates are arranged in such a manner that light having passed through the liquid crystal panel passes through the first optical compensation plate and the second optical compensation plate in this order.

4. The liquid crystal display apparatus according to claim 1,
wherein the second optical compensation plate includes inorganic material.

5. The liquid crystal display apparatus according to claim 4,
wherein, when axes orthogonal to each other in an in-plane direction are defined as an x-axis and a y-axis, and an axis parallel to a thickness direction is defined as a z-axis, in the second optical compensation plate, a refractive index in an x-axis direction becomes largest, and refractive indices in a y-axis direction and a z-axis direction are different.

6. The liquid crystal display apparatus according to claim 1,
wherein the first optical compensation plate and the second optical compensation plate are integrated together.

7. The liquid crystal display apparatus according to claim 1,
wherein the liquid crystal panel is a reflective liquid crystal panel,
a polarization element arranged between a light source and the liquid crystal panel on an optical path from the light source is included, and
the first and second optical compensation plates are arranged between the polarization element and the liquid crystal panel.

8. The liquid crystal display apparatus according to claim 1,
wherein a rotation adjustment mechanism configured to adjust a rotation angle of the second optical compensation plate about an axis substantially parallel to either a thickness direction of the second optical compensation plate or a thickness direction of the liquid crystal panel is included.

9. The liquid crystal display apparatus according to claim 1,
wherein the film of the first optical compensation plate includes an inorganic material.

10. A display method for performing image display by projecting light from a light source via:
a vertical alignment liquid crystal panel;
a first optical compensation plate including a medium having a smaller refractive index in a thickness direction than in an in-plane direction, and being arranged with being tilted from a state parallel to the liquid crystal panel, at a position at which light having passed through the liquid crystal panel or not having passed through the liquid crystal panel enters, the first optical compensation plate being formed of a film on a transparent substrate; and a second optical compensation plate having refractive index aeolotropy at least in an in-plane direction, and being arranged at a position at which light having passed through the liquid crystal panel or not having passed through the liquid crystal panel enters, wherein the first optical compensation plate is arranged with being tilted in a same direction as a tilt direction of a liquid crystal of the liquid crystal panel from a state parallel to the liquid crystal panel, and wherein a tilt angle of the first optical compensation plate from the parallel state is set to an angle less than a pre-tilt angle of the liquid crystal panel.

\* \* \* \* \*